(12) United States Patent
Fukunaga et al.

(10) Patent No.: US 8,199,083 B2
(45) Date of Patent: Jun. 12, 2012

(54) DISPLAY DEVICE

(75) Inventors: Yoko Fukunaga, Kanagawa (JP);
Yasuyuki Matsui, Kanagawa (JP);
Daisuke Takama, Kanagawa (JP)

(73) Assignee: Sony Corporation, Tokyo (JP)

( * ) Notice: Subject to any disclaimer, the term of this patent is extended or adjusted under 35 U.S.C. 154(b) by 744 days.

(21) Appl. No.: 12/335,088

(22) Filed: Dec. 15, 2008

(65) Prior Publication Data

US 2009/0161051 A1    Jun. 25, 2009

(30) Foreign Application Priority Data

Dec. 19, 2007    (JP) .................................. 2007-328069

(51) Int. Cl.
*G09G 3/34*    (2006.01)

(52) U.S. Cl. ................. 345/84; 345/87; 345/98; 345/73

(58) Field of Classification Search .................. 345/207, 345/84, 87, 76, 98; 349/42, 115, 43, 106, 349/114, 156; 313/489
See application file for complete search history.

(56) References Cited

U.S. PATENT DOCUMENTS

| | | | |
|---|---|---|---|
| 6,219,113 B1 * | 4/2001 | Takahara | 349/42 |
| 7,719,641 B2 * | 5/2010 | Kim et al. | 349/114 |
| 7,750,987 B2 * | 7/2010 | Byun et al. | 349/43 |
| 7,952,662 B2 * | 5/2011 | Itou et al. | 349/114 |
| 2002/0171800 A1 * | 11/2002 | Miyazaki et al. | 349/156 |
| 2004/0090170 A1 * | 5/2004 | Cha et al. | 313/489 |
| 2005/0122450 A1 * | 6/2005 | Kang | 349/114 |
| 2006/0244693 A1 | 11/2006 | Yamaguchi et al. | |
| 2008/0036949 A1 * | 2/2008 | Kim et al. | 349/106 |
| 2009/0128529 A1 * | 5/2009 | Izumi et al. | 345/207 |
| 2010/0134734 A1 * | 6/2010 | Kim et al. | 349/114 |

FOREIGN PATENT DOCUMENTS

| | | |
|---|---|---|
| JP | 05-275644 | 10/2005 |
| JP | 06-301864 | 11/2006 |
| JP | 07-306896 | 11/2007 |
| JP | 2007-310628 | 11/2007 |

OTHER PUBLICATIONS

Japanese Patent Office, Office Action, issued in connection with Japanese Patent Application Serial No. 2007-328069, dated Feb. 9, 2012. (4 pages).

* cited by examiner

*Primary Examiner* — Thuy Pardo
(74) *Attorney, Agent, or Firm* — K&L Gates LLP

(57) ABSTRACT

A display device. The display device including a display surface, a plurality of pixel areas, a plurality of sensor areas, an optical filter portion, a light shielding portion, and an arithmetically operating portion.

5 Claims, 16 Drawing Sheets

FIG.7A  PIN STRUCTURE
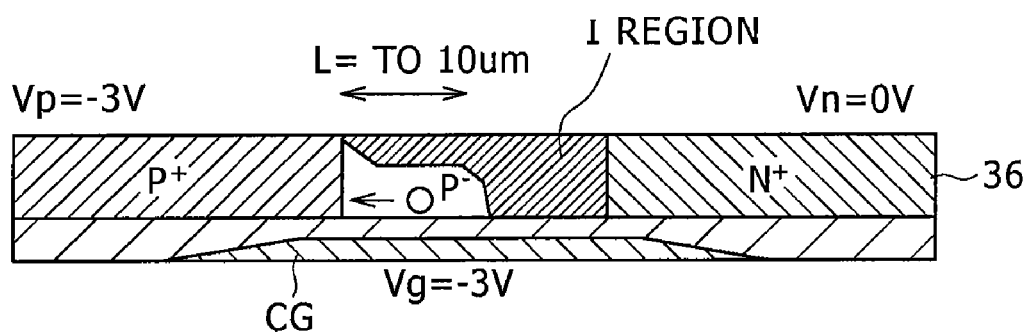
FIG.7B  PDN STRUCTURE
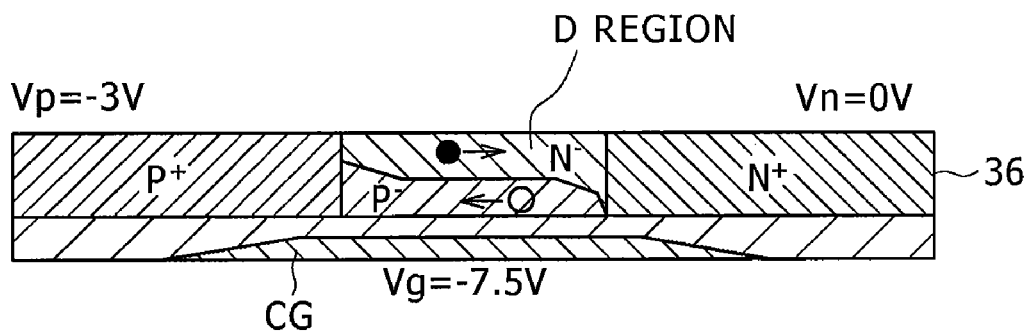

FIG. 8
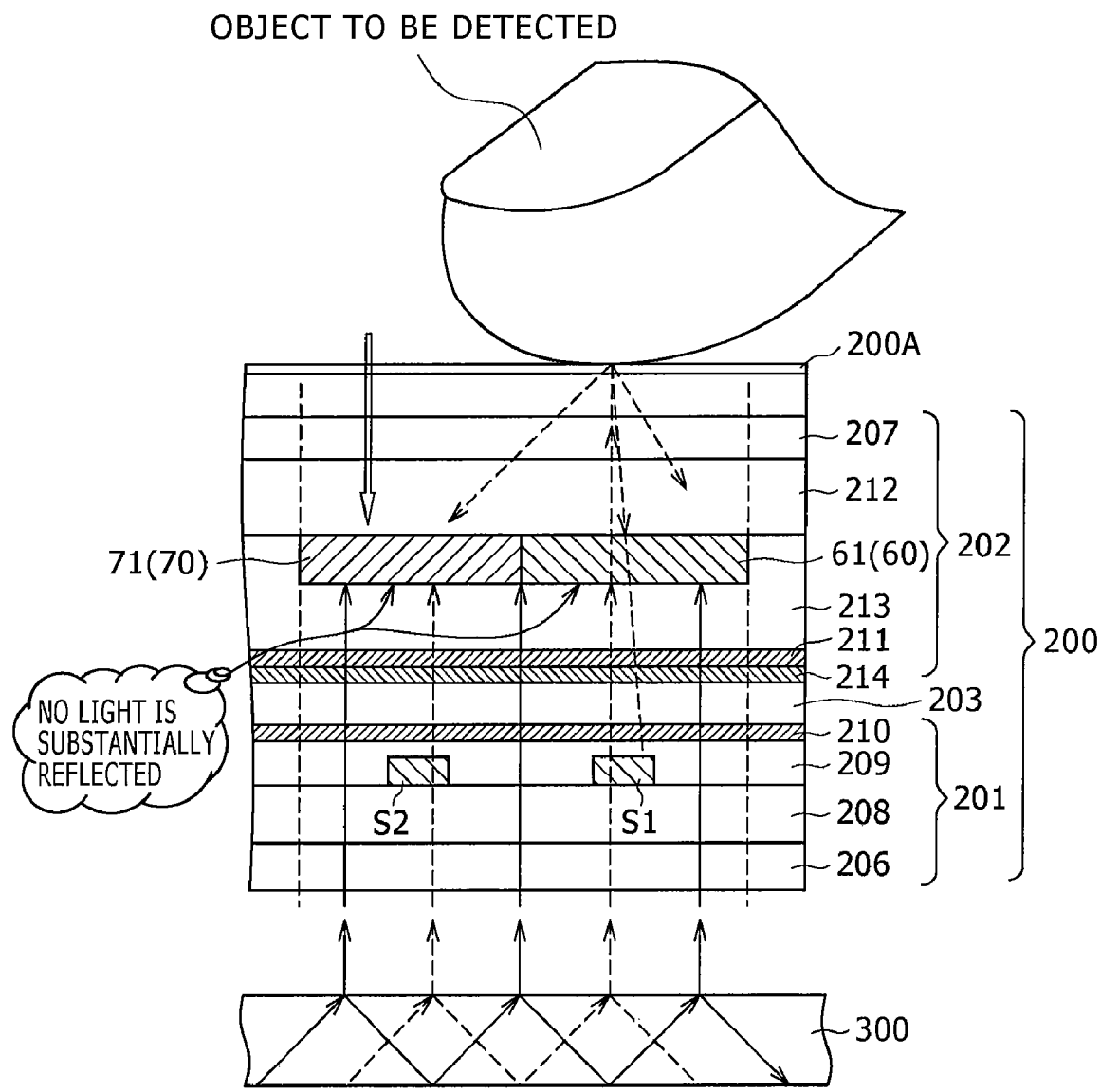
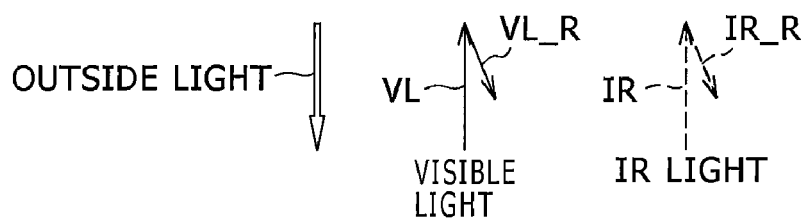

TWO LAYER STRUCTURE

NONAPPLICATION

APPLICATION

DISPLAY DEVICE

CROSS REFERENCE TO RELATED PATENTS

The present application claims priority to Japanese Patent Application JP 2007-328069 filed in the Japan Patent Office on Dec. 19, 2007, the entire contents of which being incorporated herein by reference.

BACKGROUND

The present application relates to a display device which includes a display surface and which can display information such as an image or characters on the display surface, and more particularly to a display device which can detect an object to be detected either contacting or approaching a display surface.

A liquid crystal display device, an organic EL (electroluminescence) display device, and a display device utilizing an electrophoresis method are known as display devices each capable of displaying thereon information such as an image or characters.

Along with the promotion of the thinning of the display devices, numerous functions having a function of an input unit or the like for inputting therethrough an instruction or the like from a user as well as an original function of displaying an image, characters or the like are required for the display devices. A display device capable of detecting that a finger of a user or a stylus pen (a so-called touch pen or the like) manipulated by the user either contacts or approaches a display screen is known as a display device which responds to this requirement.

The detection of contact can be carried out with a touch panel utilizing either a resistor film system or an electrostatic capacitance system. Also, there is known a display device having a touch panel which is added to a display surface side of a display panel such as a liquid crystal panel.

However, the addition of the touch panel to the display surface side of the display panel is disadvantageous in the promotion of the thinning of the display panel, and triggers cost-up of the display device. In particular, in the case of the touch panel utilizing the resistor film system, no change in resistance value of the resistor film can be detected unless the screen is depressed with certain degree of a strength. For this reason, the display surface is deformed. In addition, the general principle of the touch panel utilizing the resistor film system is one point detection. Thus, use application of the touch panel is limited.

A display device having an optical position detecting function, and a light receiving element built in a display panel for detecting an indicated position is known as a display device, utilizing an indicated position detecting system, which requires no touch panel. This display device, for example, is described in Japanese Patent Laid-Open Nos. 2005-275644 and 2006-301864.

In the optical position detection, a system for detecting a shadow of a finger or the like of a human being based on a quantity of outside light received is generally used. In the case where there is an object (such as a finger of a human being, or a stylus pen manipulated by the human being which will be referred hereinafter to as "an object to be detected") when the outside light is made incident to the display surface, a level of an output signal from a light receiving element for detecting the outside light is low due to the presence of a shadow of the object to be detected. Thus, a position of the object to be detected is identified based on the output signal from the light receiving element.

On the other hand, the display device described in Japanese Patent Laid-Open No. 2006-301864 has a light receiving element (hereinafter referred to as "an optical sensor"), having sensitivity to a nonvisible light, which is provided inside a liquid crystal (or organic EL) display panel.

In the case of the liquid crystal display panel, a backlight is disposed on one principal surface (back surface) side of the liquid crystal display panel. Lights from the backlight contain therein a visible light component and a nonvisible light component. The lights from the backlight suffer the modulation corresponding to an input video signal in a liquid crystal layer when being transmitted through the liquid crystal display panel to be emitted from the other principal surface (a front surface or a display surface). The visible light component of the emitted lights is modulated, thereby displaying a predetermined image on the display surface.

When there exists an object (an object to be detected) either contacting or approaching the display surface side of the liquid crystal display panel, a part of the emitted lights is reflected by the object to be detected to become a reflected light which is in turn guided to the optical sensor side. The optical sensor detects especially the nonvisible light component of the reflected light from the object to be detected. A visible light cutting (non visible light selecting) filter is provided so as to correspond to an area having the optical sensor provided therein. Also, in this area, no transmitted light suffers the modulation corresponding to the video signal. For this reason, the object to be detected can be detected without being influenced by the display state, and without being influenced by a degree of an environmental brightness. A large number of optical sensors are disposed regularly (discretely and two-dimensionally), which results in that it is possible to detect a position and a size of the object to be detected.

The organic EL display device requires no backlight, and a pixel itself emits a light. In this case, light emitting elements for emitting nonvisible lights, and light receiving elements for receiving the nonvisible lights are disposed at predetermined intervals within a display area of a panel. A method itself of detecting the object to be detected is similar to that in the case of the liquid crystal display device described above. The nonvisible lights emitted from the light emitting elements are reflected by the object to be detected. Also, differences in quantities of reflected lights are detected by a plurality of light receiving elements which are disposed discretely, two-dimensionally, thereby making it possible to detect a position and a size of the object to be detected.

In the display device described in Japanese Patent Laid-Open No. 2005-2756644, an optical sensor is disposed on a backlight side of a spacer through which the liquid crystal layer is separated so as to correspond to the pixels. An area in which a light receiving element having sensitivity to the visible light (hereinafter referred to as "a visible light sensor") is disposed, and an area in which an applied voltage to the liquid crystal layer can be changed so as to correspond to a video signal, and thus the transmitted light can be modulated (hereinafter referred to as "a light modulation area") are both provided in an area within the pixel different from the dispersion area of the optical sensor.

In the display device described in Japanese Patent Laid-Open No. 2005-275644, the lights reflected by the object to be detected such as the finger of the human being, or the stylus pen manipulated by the human being can be detected based on both the nonvisible light and the visible light.

According to the techniques described in Japanese Patent Laid-Open Nos. 2005-275644 and 2006-301864, the object to be detected by using the nonvolatile light which does not exert an influence on the displayed image because it is invisible for the human being. Therefore, when a quantity of transmitted light, of the visible light, passing from a back surface to a front surface is approximately near zero as in the case of the black picture display, the object to be detected can be detected at the time as well of the black display because even when the nonvisible light is transmitted to the front surface side, no influence is exerted on the display. Thus, the object can be detected irrespective of that the circumference is either dark or bright.

SUMMARY

In the display device described in Japanese Patent Laid-Open No. 2006-301864, a filter for cutting the visible light, and selectively transmitting the nonvisible light (permselective filter) is disposed, and a circumjacent portion thereof is light-shielded by a black matrix.

A material or the like for the black matrix is not mentioned in Japanese Patent Laid-Open No. 2006-301864. However, normally, the function of the black matrix is realized by either containing a metal in a filter layer or combining a layer different from the filter layer with a metallic film in many cases.

A technique relating to detection of a position on a display surface of a display device has been proposed. This technique is stated as follows. That is to say, two sensors are provided in pair, and a detection value obtained from the second sensor (noise removing sensor) is subtracted from a detection value obtained from the first sensor (photoelectric sensor), thereby enhancing an S/N ratio of a detection signal for an object to be detected. This technique, for example, is described in Japanese Patent Laid-Open No. 2007-306896.

With this technique using the difference between the output signals from the two sensors provided in pair, a light which directly reaches the sensors from the back surfaces of the sensors, and a stray light which is returned back to the sensors through repetitive reflections or the like within the panel without reaching the object to be detected turn into noise components. Thus, these noise components can be canceled each other by the subtraction operation for the sensor output signals.

With this technique, the two sensors are disposed close to each other with a view to make the same noise components incident to the two sensors. The close disposition of the two sensors becomes essential to a viewpoint as well of unifying the light receiving device characteristics of the two sensors.

Also, the light-shielding needs to be performed for the second sensor in order to prevent the reflected lights from the object to be detected from being made incident to the second sensor.

However, for example, it is assumed that the black matrix shown in Japanese Patent Laid-Open No. 2006-301864 is used for the light-shielding. In this case, if there is a difference between a reflectivity of the light, from the sensor side, in the black matrix, and a reflectivity of the light, from the sensor side, in the permselective filter, even when the two sensors are disposed close to each other, a difference occurs between the noise components in some cases.

For example, when the permselective filter is made of a material which hardly reflects the light, and thus has a lower reflectivity than that of the black matrix, the noise components due to the lights which are returned back by the reflection are each large in the second sensor disposed in a position corresponding to the black matrix. Conversely, the noise components due to the reflection are each small in the first sensor.

The difference in magnitude between those noise components in the first and second sensors reduces the precision of the detection result of obtaining the difference between the sensor output signals.

On the other hand, in the display device described in Japanese Patent Laid-Open No. 2005-275644, a light shielding layer called "a BM layer" covers the back surface of the sensor, thereby reducing the noise components made directly incident to the sensor.

However, the light-shielding for the large area on the back surface side reduces a quantity of nonvisible light used in the object detection. If the quantities of nonvisible lights made incident from the back surfaces to the two sensors are assumed to be equal to each other, when the light shielding layer is provided on the back surface side, each of the signal components themselves of the sensor output signals becomes small. This case also leads to the reduction of the S/N ratio.

With the technique using the difference between the two sensor output signals, there is no necessity for light-shielding the back surface side of the sensor so much because the lights made directly incident to the two sensors, respectively, are uniform. However, there is the necessity for light-shielding the display surface side, of the second sensor, to which the reflected lights from the object are made incident. In this case, however, even when the light from the display surface side can be shielded for the second sensor, the light from the back surface side is not shielded. Thus, when there is a difference in reflectivity for the light from the back surface side between the light shielding portion such as the black matrix and the permselective filter portion disposed adjacent thereto, it is impossible to avoid that a difference in noise component occurs between the first and second sensors.

According to an embodiment there is provided a display device, including:

a display surface on which information is displayed;

a plurality of pixel areas including optical elements, respectively, each of the optical elements being adapted to generate a light having an intensity corresponding to data inputted and to output the light to the display surface;

a plurality of sensor areas each of which includes a pair of light receiving elements, each of the light receiving elements being adapted to receive an incident light and to subject the incident light to photoelectric conversion;

an optical filter portion disposed between a first light receiving element and the display surface within the corresponding one of the plurality of sensors, the optical filter portion being adapted to absorb and shield the incident light in a visible light band, and to transmit the incident light in a nonvisible light band;

a light shielding portion, having a light absorbing property, disposed between a second light receiving element disposed close to the first light receiving element, and the display surface within the corresponding one of the plurality of sensor areas, the light shielding portion being adapted to absorb and shield the incident light; and an arithmetically operating portion for obtaining a difference between an output signal from the first light receiving element, and an output signal from the second light receiving element.

According to another embodiment there is provided a display device, including:

a display surface on which information is displayed;

a plurality of pixel areas including optical elements, respectively, each of the optical elements being adapted to generate a light having an intensity corresponding to data inputted and to output the light to the display surface;

a plurality of sensor areas each of which includes a pair of light receiving elements, each of the light receiving elements being adapted to receive an incident light and to subject the incident light to photoelectric conversion;

an optical filter portion disposed between a first light receiving element and the display surface within the corresponding one of the plurality of sensors, the optical filter portion being adapted to absorb and shield the incident light in a visible light band, and to transmit the incident light in a nonvisible light band;

a wavelength-selective mirror portion disposed between a second light receiving element disposed close to the first light receiving element, and the display surface within the corresponding one of the plurality of sensor areas, the wavelength-selective mirror portion being adapted to reflect a nonvisible light, in a specific wavelength band, made incident thereto from the display surface side, to transmit a light in a wavelength band other than the specific wavelength band, and to transmit a light made incident thereto from a side opposite to the display surface side; and an arithmetically operating portion for obtaining a difference between an output signal from the first light receiving element, and an output signal from the second light receiving element.

According to an embodiment, there is obtained an advantage that the S/N ratio of the detection result obtained in the arithmetically operating portion is high because the light components reflected by the optical filter portion and the light shielding portion (or the wavelength selective mirror portion), respectively, either do not exist or are remarkably small.

Additional features and advantages are described herein, and will be apparent from the following Detailed Description and the figures.

BRIEF DESCRIPTION OF THE FIGURES

FIGS. 7A and 7B are respectively schematic views of a photodiode having a PDN structure, and a photodiode having a PDN structure in the transmission type liquid crystal display device according to the first to third embodiments;

FIG. 8 is a more detailed cross sectional view of FIG. 2 explaining an operation of the liquid crystal panel in the transmission type liquid crystal display device according to the first embodiment;

DETAILED DESCRIPTION

An embodiment will be described based on a liquid crystal display device with which a position, a size and the like of an object to be detected can be detected based on an infrared (IR) light with reference to the accompanying drawings. It is noted that although a position, a size and the like of an object to be detected are detected based on a nonvisible light in the present invention, the detection based on the IR light will now be mainly exemplified in embodiments. A position, a size and the like of an object to be detected can also be detected based on a nonvisible light other than the IR light as will be described later.

[First Embodiment]

A first embodiment relates to a transmission type liquid crystal display device having a backlight.

Figure 1:
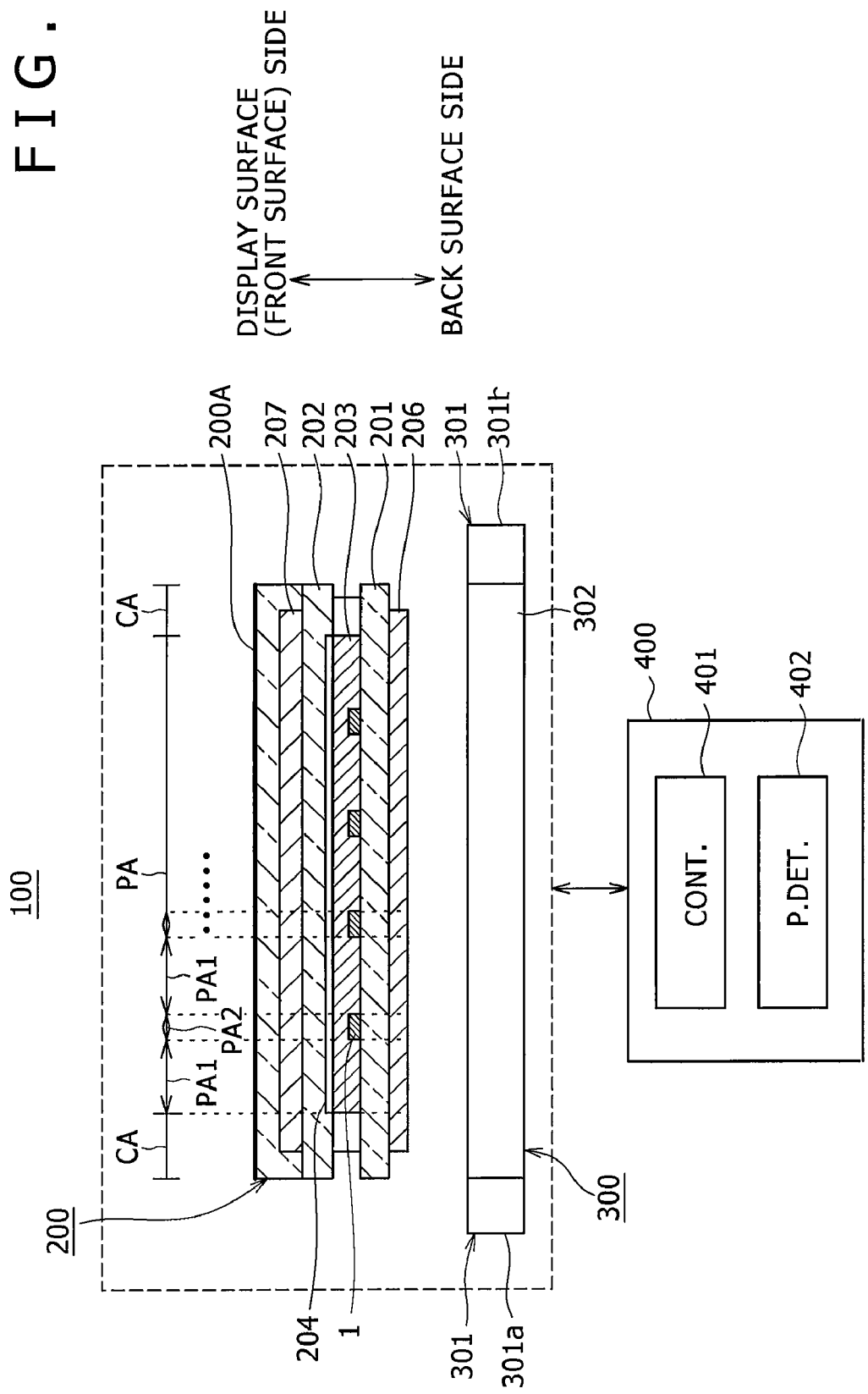
FIG. 1 is a schematic cross sectional view, partly in block, showing an entire structure of a transmission type liquid crystal display device according to a first to third embodiments.

FIG. 1 is a schematic cross sectional view, partly in block, showing an entire structure of the transmission type liquid crystal display device. In addition, FIG. 2 is a cross sectional view showing a more detailed structure of a liquid crystal panel 200 shown in FIG. 1.

A liquid crystal display device 100 illustrated in FIG. 1 includes the liquid crystal panel 200 having a display surface 200A, a backlight 300, and a data processing portion 400.

Figure 2:
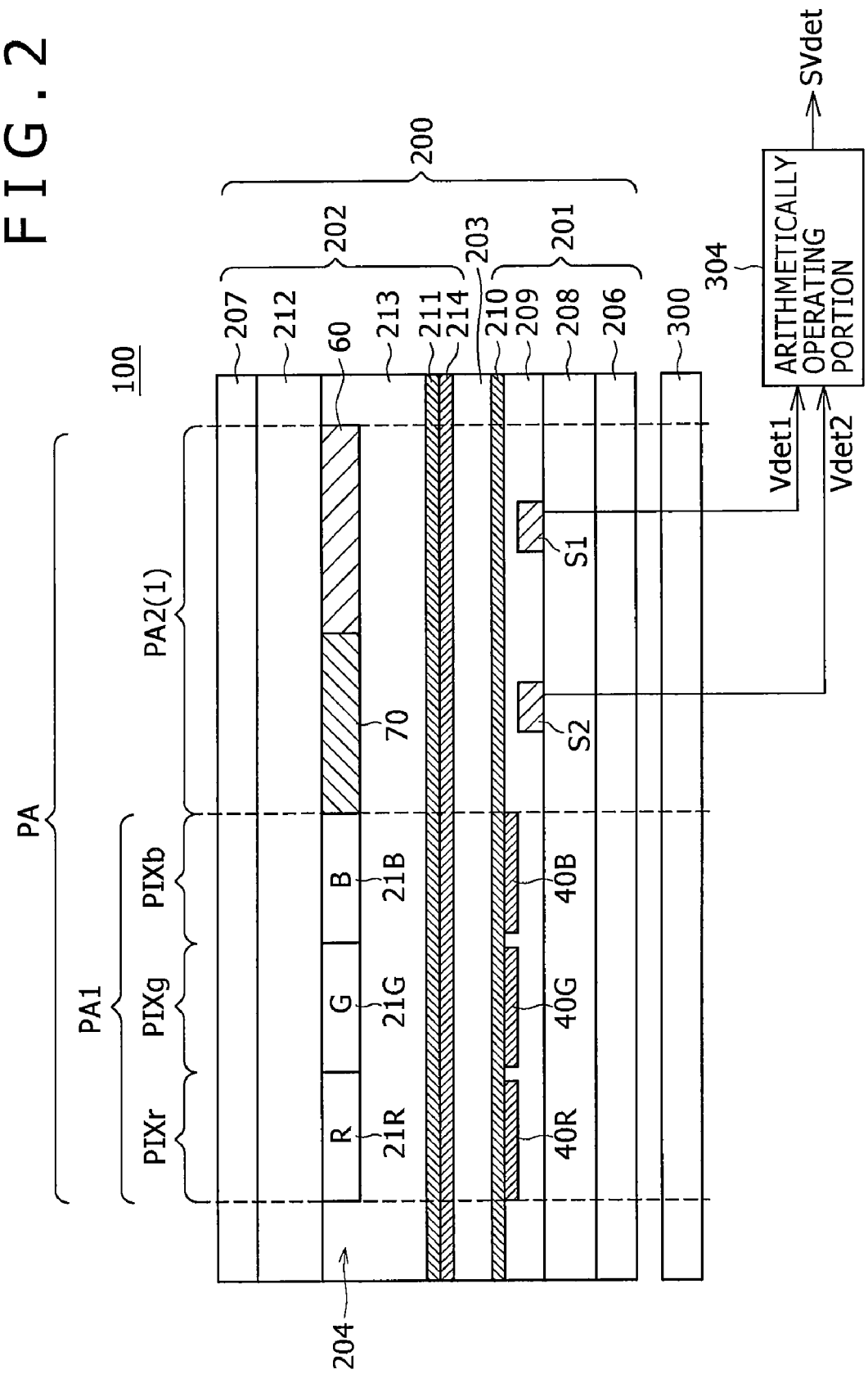
FIG. 2 is a cross sectional view showing a more detailed structure of a liquid crystal panel shown in FIG. 1.

FIG. 2 shows an effective display area PA of an area within a surface when viewed from the display surface 200A of the liquid crystal panel 200. Although details will be described later, the effective display area PA can be partitioned into a pixel area PA1 and a sensor area PA2.

As shown in FIGS. 1 and 2, the liquid crystal panel 200 includes a TFT array substrate 201, a color filter substrate 202 (hereinafter referred to as "a CF substrate") as a so-called "counter substrate," and a liquid crystal layer 203. In this case, the TFT array substrate 201 and the CF substrate are disposed so as to face each other. Also, the liquid crystal layer 203 has a liquid crystal enclosed within a space defined between the TFT array substrate 201 and the CF substrate 202. The liquid crystal panel 200 is disposed so as to face the backlight 300 so that the TFT array substrate 201 is located on the backlight 300 side, and the CF substrate 202 is located on the side opposite to the backlight 300.

Hereinafter, the backlight 300 side in a direction of a thickness of the liquid crystal panel 200 will be referred to as "a back surface side," while the side opposite to the back surface side will be referred to as either "a display surface side" or "a front side."

The TFT array substrate 201 has a glass substrate 208 as a base. Various members are provided in a lamination form on the glass substrate 208.

Specifically, a polarizing plate 206 for converting a light into a polarized light is stuck to the back surface side of the glass substrate 208. In addition, in the pixel area PA1, a planarizing film 209, pixel electrodes 40R, 40G and 40B, and an oriented film 210 are laminated on a surface of the glass substrate 208 on the liquid crystal layer 203 side in the order of being near the glass substrate 208. In this case, the planarizing film 209 planarizes irregularities caused by forming the pixel electrodes 40R, 40G and 40B. The pixel electrodes 40R, 40G and 40B are provided so as to correspond to pixels PIXr, PIXg and PIXb, respectively, in order to apply a suitable voltage to the liquid crystal layer 203. Also, the oriented film 210 orients liquid crystal molecules in the liquid crystal layer 203.

Note that, in addition thereto, data electrodes, TFTs, capacitors, and the like are provided in the TFT array substrate 201. In this case, in general, the data electrode is also called an X electrode, a data signal line, or a source signal line in some cases. The TFT serves as a switching element for driving the liquid crystal. Also, the capacitor serves as a signal holding capacitor (which may also be called an auxiliary capacitor because it assists the capacitance of the liquid crystal) for an active matrix operation. Referring to FIGS. 1 and 2, a protective film, an insulating film and the like are provided in suitable positions on the TFT array substrate 201, respectively.

As shown in FIG. 1, a surface of the protective film on the front surface of the liquid crystal panel 200 is especially called "a display surface 200A."

The CF substrate 202 has a glass substrate 212 as a base. Various members are provided in a lamination form on the glass substrate 212. Specifically, a polarizing plate 207 for converting a light into a polarized light is stuck to the display surface side of the glass substrate 212. In addition, a red filter 21R, a green filter 21G, and a blue filter 21B (hereinafter referred to as "a color filter 21" in some cases), a planarizing film 213, a common electrode 211, and an oriented film 214 are laminated on a surface of the glass substrate 212 on the liquid crystal layer 203 side in the order of being near the glass substrate 212 side. In this case, the red filter 21R, the green filter 21G, and the blue filter 21B are provided so as to correspond to the pixels PIXr, PIXg and PIXb, respectively. The planarizing film 213 planarizes the irregularities caused by forming the color filters 21. The common electrode 211 is provided commonly to a plurality of pixels PIXr, PIXg and PIXb in order to apply a suitable voltage to the liquid crystal layer 203. Also, the oriented film 214 orients the liquid crystal molecules in the liquid crystal layer 203.

The color filter 21 is formed in a color filter layer 204, and transmits a visible light having a wavelength in a predetermined wavelength band (a light having a predetermined color) and absorbs a visible light having a wavelength in a wavelength band other than the predetermined wavelength band. A light having a wavelength in a wavelength band other than that of the wavelength of the visible light, especially, an infrared light (an IR light) will be described later.

With regard to the predetermined wavelength band of the visible light, for example, in Commission Internationale de l'Eclairage (CIE), it is defined that a wavelength of a red monochromatic light is 700 nm, a wavelength of a green monochromatic light is 546.1 nm, and a wavelength of a blue monochromatic light is 435.8 nm. Thus, the red filter 21R, the green filter 21G and the blue filter 21B are formed so that their transmittances become high (although the heights are basically grasped based on relative heights of the transmittances in the wavelengths, 60 nm or more, for example, is set as an absolute height) in the wavelength band (for example, in the range of about 50 to 120 nm) either containing therein the wavelengths described above or near the wavelengths described above. The color filter 21 may be one using pigments or one using dyes.

On the other hand, in the sensor area PA2, as shown in FIG. 1, an optical sensor portion 1 having "an optical sensor" is provided on the display surface of the TFT array substrate 201 directly facing the liquid crystal layer 203. The sensor area PA2 shown in FIG. 2 shows a cross section of the optical sensor portion 1.

The details of the optical sensor portion 1 will be described later.

The optical sensor portion 1 is formed for the purpose of giving the inside of the liquid crystal panel 200 a function of the so-called touch panel. When the liquid crystal panel 200 is viewed from the display surface 200A (front surface) side, it is understood that the optical sensor portions 1 are disposed regularly within the effective display area PA.

FIG. 1 shows a cross section of the liquid crystal panel 200 in which the optical sensor portions 1 are disposed in a matrix in the effective display area PA. In FIG. 1, a plurality of optical sensor portions 1 (only four sensor portions 1 are illustrated in this case) are disposed at equal intervals. For the position detection, it is necessary to dispose the optical sensor portions 1 the number of which is sufficiently larger than four in one direction. For the sake of convenience of the illustration, FIG. 1 shows the less display number of optical sensor portions 1, that is, the four optical sensor portions 1. When the function of the position detection is limited to a part of the effective display area PA, the optical sensor portions are displayed regularly in the display area thus limited.

When viewed from the effective display area PA of the display surface 200A, as shown in FIG. 1, an area of the liquid crystal panel 200 having the optical sensor portions 1 formed therein is defined as "a sensor area PA2," and other area of the liquid crystal panel 200 is defined as "a pixel area PA1." It is noted that these areas are three-dimensional ones containing a direction of a thickness of the panel.

In FIG. 2, the pixel electrodes 40R, 40G and 40B, and the common electrode 211 are made of transparent electrode materials, respectively.

Note that, in a liquid crystal display device or the like utilizing an FFS system which will be described later, unlike the case of FIG. 2, the common electrode 211 common to all the pixels is formed on the display surface side (the liquid crystal layer side) of the TFT array substrate 201, but on the side of the pixel electrodes 40 opposite to the liquid crystal layer 203 so as to face the pixel electrodes 40 in some cases.

The structure for light modulation is formed, including the pixel electrodes 40, the counter electrodes, the liquid crystal layer 203, and the auxiliary capacitors and the switching elements (not shown). The structure, for each pixel, including the members and materials for the light modulation is called "a liquid crystal element" in some cases. The liquid crystal element in this embodiment corresponds to an example of "an optical element" because it has a function of generating a light having an intensity corresponding to the data inputted in accordance with the control through connection to various control lines, thereby outputting the light to the display surface.

A unit composed of a plurality of pixels to which a plurality of colors correspond, respectively, that is, "a pixel unit" is structured, including the pixels PIXr, PIXg and PIXb shown in FIG. 2. When a ratio of the optical sensor portions 1 to the pixel circuits is 1:1, a disposition density of the optical sensor portions 1 becomes maximum. In this embodiment, the disposition density of the optical sensor portions 1 may take the maximum value as described above, or may be smaller than the maximum value.

The backlight 300 is disposed on the back surface side of the TFT array substrate 201. The backlight 300 faces the back surface of the liquid crystal panel 200, and emits an illumination light to the effective display area PA of the liquid crystal panel 200.

The backlight 300 exemplified in FIG. 1 has a light source 301, and a light guide plate 302 for diffusing the light radiated thereto from the light source 301 to convert the light into the planar light. Although a side light type backlight, a just-below type backlight or the like are used as the backlight 300 in correspondence to the disposition position of the light source 301 with respect to the light guide plate 302, the side light type backlight is exemplified in this case.

The light source 301 is disposed on the back side of the liquid crystal panel 200, and one side or both sides in a direction along the back surface of the liquid crystal panel 200. In other words, the light source 301 is disposed along one side or opposite two sides of the liquid crystal panel 200 when viewed from the display surface 200A (front surface). However, the light source 301 may be disposed along three or more sides of the liquid crystal panel 200.

The light source 301, for example, is composed of a cold-cathode tube lamp. Specifically, in the light source 301, an ultraviolet radiation generated from an arc in a low-pressure mercury vapor within a glass tube is converted into a visible light by a phosphor to be emitted. It is noted that the light source 301 is by no means limited to the cold-cathode tube lamp, and thus, for example, may be composed of an LED (light-emitting diode) or an EL element.

The light source 301 is composed of the LED in this case. FIG. 1 exemplifies the case where a visible light source 301a such as a white LED, and an IR light source 301b are disposed on opposite two sides, respectively.

The light guide plate 302, for example, is composed of a translucent acrylic plate. The light guide plate 302 guides the light emitted from the light source 301 along the surface (from one side to the other side in the direction along the back surface of the liquid crystal panel 200) while totally reflecting the light emitted from the light source 301. A dot pattern (composed of a plurality of protrusions)(not shown) which, for example, is formed integrally with the light guide plate 302, or is formed from a member different from that of the light guide plate 302 is provided on the back surface of the light guide plate 302. Thus, the light thus guided is scattered by the dot pattern to be radiated to the liquid crystal panel 200. It is noted that a reflecting sheet for reflecting a light may be provided on the back surface side of the light guide plate 302, or a diffusion sheet or a prism sheet may be provided on the front surface side of the light guide plate 302.

Since the back light 300 has the structure described above, it radiates an approximately uniform planar light to the entire surface of the effective display area PA of the liquid crystal panel 200.

<Assembly of Liquid Crystal Display Device>

Figure 3:
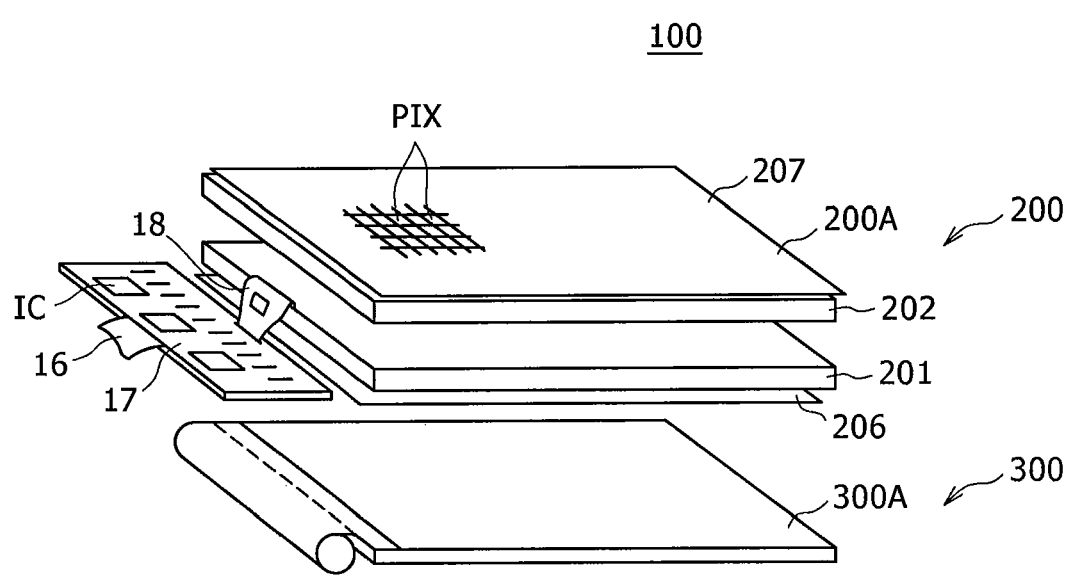
FIG. 3 is an exploded perspective view showing the structure of the transmission type liquid crystal display device shown in FIG. 1.

FIG. 3 is an exploded perspective view showing the structure of the transmission type liquid crystal display device shown in FIG. 1.

For assemble of the liquid crystal panel 200, the oriented film 210 (refer to FIG. 2) is formed after the pixel circuits, and a sensor reading-out circuit and the like which will be described later are formed on the display surface side of the TFT array substrate 201. The color filter layer 204 (refer to FIGS. 1 and 2) and the oriented film 214 (refer to FIG. 2) are formed on the other surface of the TFT array substrate 201, and a spacer (not shown) is formed. After that, the two sheets of substrates 201 and 202 are stuck to each other so that the formation surface side faces the other surface of the TFT array substrate 201. Thereafter, the liquid crystal is enclosed within the space defined between the two sheets of substrates 201 and 202 by the spacer to be sealed. The polarizing plate 206 is disposed on one surface of the TFT array substrate 201, and the polarizing plate 207 is disposed on the other surface of the CF substrate 202.

A circuit board 17 is electrically connected to the liquid crystal panel 200 through a connection body 18. A plurality of ICs and the like are previously mounted to the circuit board 17. In this case, for example, the plurality of ICs output electrical signals used to display an image on the liquid crystal panel 200 to the liquid crystal panel 200 or receive as inputs thereof electrical signals used to detect a manipulation made for the display surface 200A by a user from the liquid crystal panel 200. Each of the ICs includes a control portion (CPU). The circuit board 17 is provided with a flexible board 16 through which the liquid crystal display device 100 is connected to a mother board in an apparatus to which the liquid crystal display device 100 is to be mounted.

<Circuit Configuration of Liquid Crystal Panel>

Figure 4:
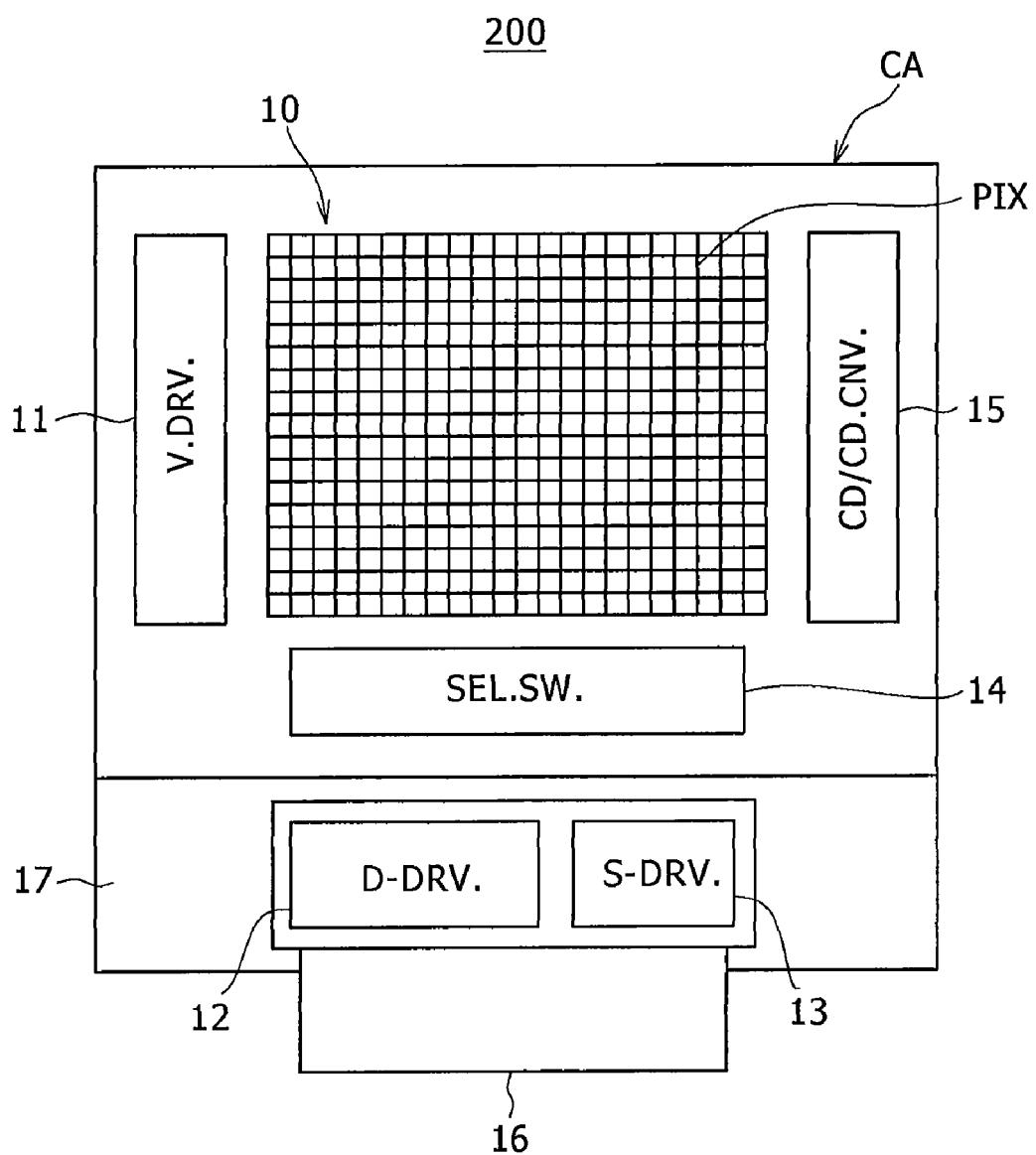
FIG. 4 is a schematic block diagram showing an example of a configuration of a drive circuit provided within the liquid crystal panel in the transmission type liquid crystal display device according to the first to third embodiments.

FIG. 4 is a schematic block diagram showing an example of a configuration of a drive circuit within the liquid crystal panel in the transmission type liquid crystal display device according to the first to third embodiments.

As shown in FIG. 4, the liquid crystal panel 200 includes a display portion 10 in which the pixels (PIXs) are disposed in a matrix. The display portion 10 is a portion of the three-dimensional liquid crystal panel 200, including a thickness direction of the panel.

As shown in FIG. 1 as well, a circumjacent area CA exists in a circumference of the effective display area PA. The circumjacent area CA means an area other than the effective display area PA in the TFT array substrate 201. As shown in FIG. 4, a drive circuit represented by several functional blocks including TFTs formed collectively with the TFTs within the effective display area PA are formed in the circumjacent area CA.

The liquid crystal panel 200 includes a vertical driver (V.DRV.) 11, a display driver (D-DRV.) 12, a sensor driver (S-DRV.) 13, a selection switch array (SEL.SW.) 14, and a DC/DC converter (DC/DC.CNV.) 15 as the drive circuit.

The vertical driver 11 is a circuit having a function of a shift register or the like for vertically scanning the various control lines wired horizontally for selection of a pixel line.

The display driver 12 is a circuit having a function of generating a data signal amplitude by sampling a data potential of a video signal, and discharging the data signal amplitude to a signal line common to the pixels in a column direction.

The sensor driver 13 is a circuit for scanning the control lines, similarly to the case of the vertical driver 11, for the optical sensor portions 1 distributively disposed within the disposition area of the pixels at a predetermined density, and collecting the sensor output signals (detection data) synchronously with the scanning for the control lines.

The selection switch array 14 is a circuit, composed of a plurality of TFT switches, for controlling the discharge of the data signal amplitude by the display driver 12, and controlling the sensor output signals from the display portion 10.

Also, the DC/DC converter 15 is a circuit for generating various D.C. voltages having potentials necessary for driving the liquid crystal panel 200.

Exchange of input and output signals to and from the display driver 12 and the sensor driver 13, and exchange of other signals between the inside and outside of the liquid crystal panel 200 are carried out through the flexible substrate 16 (refer to FIG. 3) provided in the liquid crystal panel 200.

It is noted that a liquid crystal driving IC (corresponding to the display driver 12), an IC for driving the sensors, and reading out the sensor output signals (corresponding to the sensor driver 13 or the like), and an image processing IC may be SOG-mounted to the inside of the liquid crystal panel 200. Also, the IC for driving the sensors, and reading out the sensor output signals, and the image processing IC may be integrated into one IC. In this case, the exchange of the input and output signals, etc. between each two ICs is carried out inside the liquid crystal panel 200 through an SOG mounting terminal.

In addition to the circuits shown in FIG. 4, a configuration or the like for generating a clock signal or receiving as an input thereof a signal from the outside is also included in the drive circuit.

<Pixel Portion and Optical Sensor Portion>

One of the features of the liquid crystal display device 100 of this embodiment is to have two sensors for detecting an IR light which is reflected by an object to be detected on the display surface side to be returned back to the inside of the liquid crystal panel 200, that is, a first light receiving element (hereinafter referred to as "a first sensor"), and a second light receiving element (hereinafter referred to as "a second sensor").

As shown in FIG. 2, the first sensor S1 and the second sensor S2 are disposed close to each other on the glass substrate 208. The first and second sensors S1 and S2 are referred simply to as "the sensor S" in some cases.

The first and second sensors S1 and 82 are disposed close to each other because they are made of the same semiconductor thin film and thus their light receiving characteristics need to be uniformed.

The first and second sensors S1 and S2 may be made of different materials. However, it is preferable that the first and second sensors S1 and S2 are made of the same material to have the same pattern in order to uniform their light receiving characteristics, and the spectral characteristics of an incident light are changed, so that the first sensor Si and the second sensor S2 are allocated to "object detection application" and "noise component detection application," respectively.

For this reason, in the color filter layer 204 in this embodiment, an optical filter portion 60 is disposed in a position corresponding to the first sensor S1, and a light shielding portion 70 is formed in a position corresponding to the second sensor S2. The optical filter portion 60 and the light shielding portion 70 will be described later.

Figure 5A:
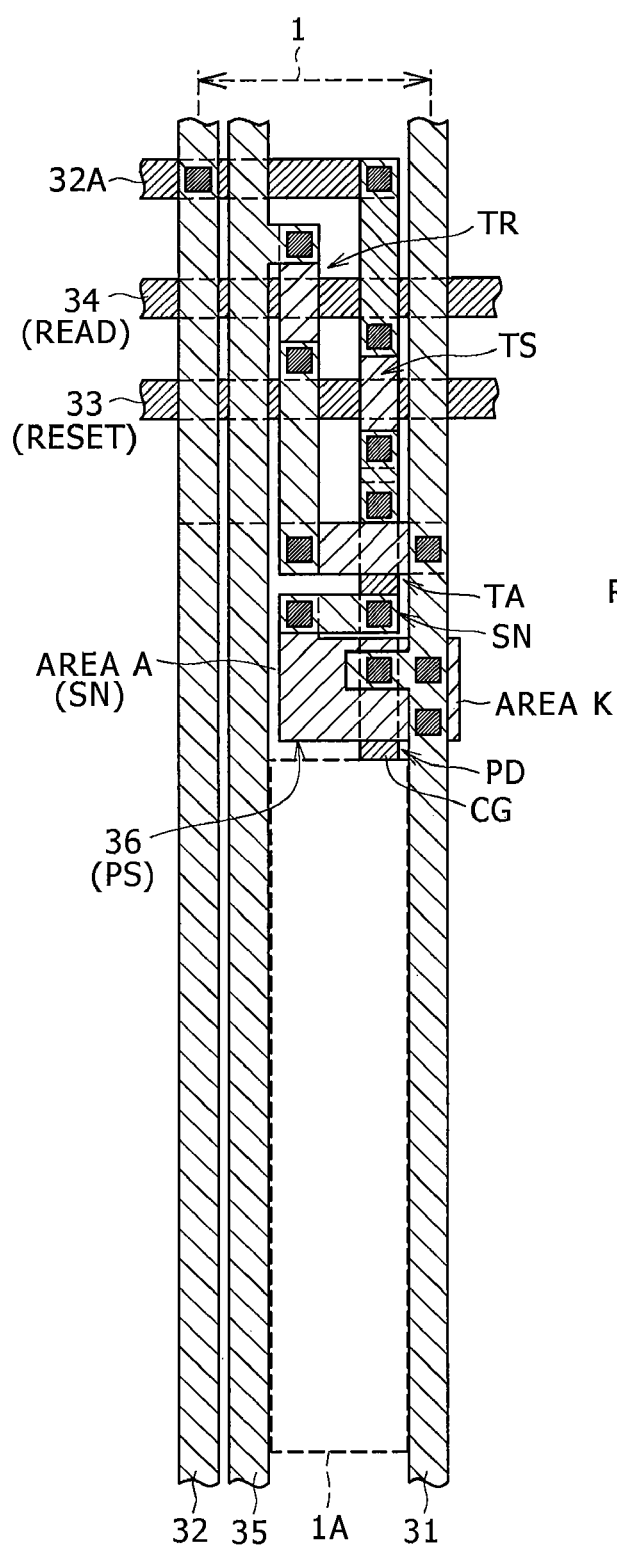
FIGS. 5A and 5B are respectively a top plan view of an optical sensor portion in the transmission type liquid crystal display device according to the first to third embodiments of the present application, and an equivalent circuit diagram of the optical sensor portion corresponding to a pattern shown in FIG. 5A.
Figure 5B:
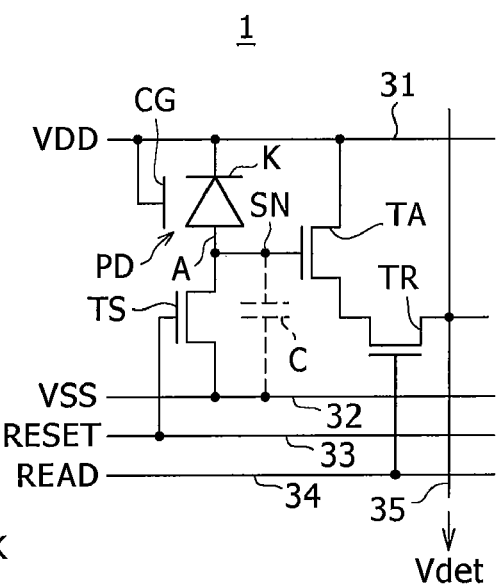

FIG. 5A is a top plan view showing the sensor S, and FIG. 5B is an equivalent circuit diagram of the sensor S corresponding to a pattern shown in FIG. 5A. The sensor S illustrated is the first or second sensor S1 or S2, and the first and second sensors S1 and S2 have the same structure.

The sensor S illustrated in FIG. 5B is composed of three transistors (N-channel TFTs in this case) and a photodiode PD.

The three transistor are a reset transistor TS, an amplifier transistor TA, a reading-out transistor TR.

An anode of the photodiode PD is connected to a storage node SN, and a cathode thereof is connected to a supply line (hereinafter referred to as "a VDD line") 31 for a power source voltage VDD. The photodiode PD, as will be described later, has either a PIN structure or a PDN structure, and includes a control gate CG for applying an electric field to an Intrinsic (I) region (an intrinsic semiconductor region of the PIN structure) or a doped (D) region (an N-type region of the PDN structure) through an insulating film. The photodiode PD is used in a state of being reversely biased, and controls the degree of depletion at this time with its control gate CG, thereby making it possible to optimize (normally maximize) the sensitivity. The photodiode PD is structured in the manner as described above.

It is noted that the photodiode PD may be treated as an example of "the light receiving element."

A drain of the reset transistor TS is connected to the storage node SN, a source thereof is connected to a supply line (hereinafter referred to as "a VSS line") for a reference voltage VSS, and a gate thereof is connected to a supply line (hereinafter referred to as "a reset line") 33 for a reset signal (RESET). The reset transistor TS switches the storage node SN from a floating state over to a state of connection to the VSS line 32 to discharge the electric charges accumulated in the storage node SN, thereby resetting an amount of electric charges accumulated.

A drain of the amplifier transistor TA is connected to the VDD line 31, a source thereof is connected to an output line (hereinafter referred to as "a detection line") for a detection potential Vdet (or a detection current Idet) through the reading-out transistor TR, and a gate thereof is connected to the storage node SN.

A drain of the reading-out transistor TR is connected to the source of the amplifier transistor TA, a source thereof is connected to the detection line 35, and a gate thereof is connected to a supply line (hereinafter referred to as "a read control line") 34 for the read control signal (READ).

The amplifier transistor TA has an operation for amplifying an amount of positive charges accumulated (light reception potential) when the positive charges generated in the photodiode PD are accumulated in the storage node SN becoming the floating state again after completion of the resetting. The reading-out transistor TR is a transistor for controlling a timing at which the light reception potential amplified by the amplifier transistor TA is discharged to the detection line 35. After a lapse of a given accumulation time, the read control signal (READ) is activated to turn ON the reading-out transistor TR. As a result, suitable voltages are applied to the source and drain of the amplifier transistor TA, respectively. Thus, the amplifier transistor TA causes a current corresponding to a gate potential thereof to flow therethrough. As a result, a charge in potential having the increased amplitude is developed on the detection line 35 so as to correspond to the light reception potential. Also, this potential change is outputted in the form of a detection potential Vdet from the detection line 35 to the outside of the optical sensor portion 1. Or, the detection current Idet a value of which changes in correspondence to the received light potential is outputted from the detection line 35 to the outside of the optical sensor portion 1.

FIG. 5A shows a top plan view of the TFT array substrate 201 before the TFT array substrate 201 is stuck to the CF substrate 202, and the liquid crystal is enclosed within the space defined between the TFT array substrate 201 and the CF substrate 202 as shown in FIG. 4.

The electrical connection between each two elements is obviously understood because in the pattern view shown in FIG. 5A, the elements and the node shown in FIG. 5B are designated with the same reference numerals and reference symbols, respectively.

Each of the VDD line 31, the VSS line 32 and the detection line 35, for example, is formed from wiring layer made of aluminum (AL). Also, each of the reset line 33 and the read control line 34 is formed from a wiring layer made of a gate metal (GM), for example, molybdenum (Mo). The gate metal (GM) layer is formed in a lower layer than the wiring layer made of aluminum (AL). Four polysilicon (PS) layers are disposed in isolation in a layer which is formed above the gate metal (GM) layer, and below the aluminum (AL) layer. The reset transistor TS, the reading-out transistor TR, the amplifier transistor TA, and the photodiode PD have the PS layers, respectively.

Each of the reset transistor TS, the reading-out transistor TR, and the amplifier transistor TA has a transistor structure in which an N-type impurity is introduced into each of one side and the other side of a portion of the PS layer intersecting with the gate metal (GM) layer, thereby forming a source and a drain, respectively.

On the other hand, the photodiode PD has a diode structure because a P-type impurity and an N-type impurity are introduced into one side and the other side of the thin film semiconductor layer formed from the PS layer, respectively. A P-type impurity region composes an anode (A) region of the photodiode PD or the storage node SN. An N-type impurity region composes a cathode (K) region of the photodiode PD, and is connected to the upper VDD line 31 through a contact.

It is noted that although in the top plan view shown in FIG. 5A, the backlight sides of the light receiving regions (the I region or the D region) which the three transistors TR, TS and TA have, respectively, are light-shielded by the electrodes which the three transistors TR, TS and TA have, respectively, the front sides thereof also need to be shielded from the outside light.

From the same reason as that in the above, the front surface side of the switching element SW in the pixels PIXs is also light-shielded.

Figure 6:
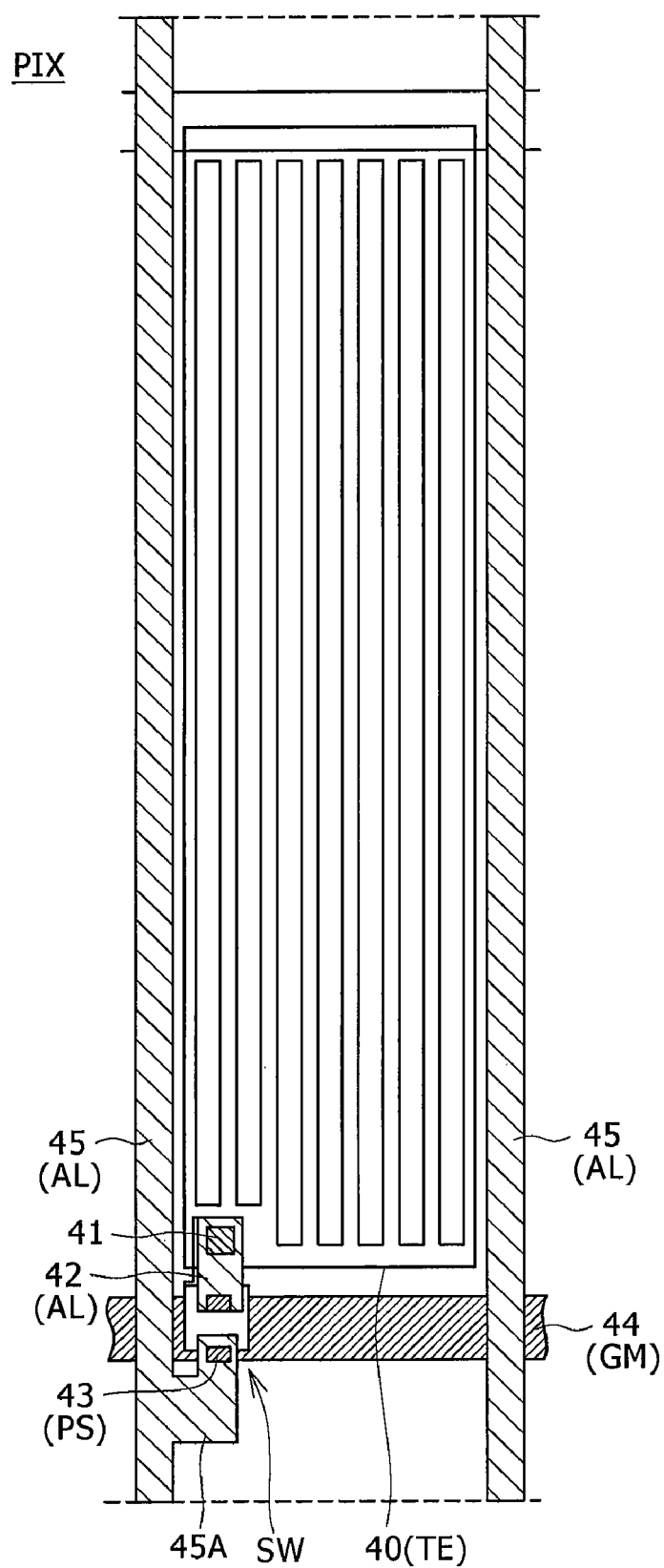
FIG. 6 is a top plan view of a TFT array substrate portion corresponding to pixels in the transmission type liquid crystal display device according to the first to third embodiments.

FIG. 6 shows a top plan view of the TFT array substrate 201 in the pixel PIX having the liquid crystal using a Field Fringe Switching (FFS) system. Another name for the liquid crystal using the FFS system is "the liquid crystal using a "In Plane Switching (IPS)-Pro" system.

FIG. 6 shows a pixel electrode 40 formed with the TFT array substrate 201 as a base, various wirings, a switching element SW, and connection between each two elements.

The pixel electrode 40 is formed from a transparent electrode layer (TE), and has a plurality of slits. Although not especially illustrated, a common electrode is formed below the pixel electrode 40 so as to just face the pixel electrode 40. The common electrode is formed from a transparent electrode layer (TE) common to all the pixels.

The pixel electrode 40 is connected to an internal wiring 42 made of aluminum (AL) or the like, as a lower layer through a contact 41. The inner wiring 42 is connected to one of a source and a drain which are formed in a thin film semiconductor layer 43, of a switching element SW, made of polysilicon (PS). A signal line 45 made of aluminum (AL) is connected to the other of the source and the drain formed in the thin film semiconductor layer 43. A vertical scanning line 44 intersecting with a layer underling the thin film semiconductor layer 43 is made of a gate metal (GM) such as molybdenum (Mo), and is disposed in a direction of intersecting perpendicularly the signal line 45.

It is noted that the CF substrate 202 is disposed above (a portion (not shown)) the TFT array substrate 201 having the various patterns shown in FIG. 6. Also, the liquid crystal layer 203 is enclosed within the space defined between the TFT array substrate 201 and the CF substrate 202 (refer to FIG. 1). In addition, the polarizing plate 206 and the polarizing plate 207 are disposed so as to sandwich the TFT array substrate 201 and the CF substrate 202 between them.

Here, the liquid crystal layer 203 is composed of a nematic liquid crystal. The polarizing plate 206 and the polarizing plate 207 which are tightly provided on the outer surfaces of the TFT array substrate 201 and the CF substrate 202 through adhesive agents, respectively, are disposed in a cross-Nicol manner.

Aluminum (Al), molybdenum (Mo), chromium (Cr), tungsten (W), titanium (Ti), or lead (Pb), or a composite layer thereof (such as Ti/Al), or an alloy layer thereof can be used as a material for each of the signal line 45 and the vertical scanning line 44 (the gate metal (GM)). <Structure and Light Receiving Characteristics of Photodiode PD>

FIG. 7A shows the photodiode PD having a PIN structure, and FIG. 7B shows the photodiode PD having a PDN structure.

In a thin film semiconductor layer 36 of the photodiode PD, a region having light receiving sensitivity is an I region having no impurity introduced thereinto in the PIN structure (refer to FIG. 7A), and is a D region (an N-type region) having an N-type impurity introduced thereinto at a low concentration in the PDN structure (refer to FIG. 7B).

When, for example, a reverse bias is applied to the thin film semiconductor layer 36 as shown in FIG. 7A or FIG. 7B, a depletion layer spreads in the inside of the I region or the D region. In order to promote the spreading of the depletion layer, back gate control (control for an electric field by a control gate (G)) is carried out. However, the depletion layer spreads to about 10 μm at the most from a P+ region in the PIN structure. On the other hand, the PDN structure has an advantage that an area having the light receiving sensitivity is wide all the more because the entire region of the D region is approximately, completely depleted.

In this embodiment, the PIN structure and the PDN structure can be both adopted.

The photodiode PD as a position sensor having such a structure is designed so as to have sensitivity to a nonvisible light, for example, an infrared light. It is preferable that the photodiode PD has large sensitivity to the infrared light. However, when the sensitivity to the visible light or the near-ultraviolet light, it is best to combine the photodiode PD with an IR filter for selectively transmitting the infrared light.

The nonvisible lights, for example, contain the infrared light or the ultraviolet light. It is noted that a boundary in wavelength between the ultraviolet light (it is also an example of the nonvisible light) and the visible light is set in the range of 360 to 400 nm, and a boundary in wavelength between the visible light and the infrared light is set in the range of 760 to 830 nm. However, practically, the light having a wavelength of 350 nm or less may be set as the ultraviolet light, and the light having a wavelength of 700 nm or more may be set as the infrared light. In this case, the range of the wavelength of the nonvisible light is set as being equal to or smaller than 350 nm and being equal to or larger than 700 nm. However, in this embodiment, a boundary of the wavelength of the nonvisible light may be arbitrarily regulated within the range of 360 to 400 nm and the range of 760 to 830 nm as described above.

When the infrared light (IR light) is used as the nonvisible light, the thin film semiconductor layer 36 (refer to FIG. 7) of the photodiode PD having the sensitivity to the IR light is preferably made of polycrystalline silicon or crystalline silicon. In this case, an energy band gap between a valance band and a conduction band of polycrystalline silicon or crystalline silicon is 1.1 eV which is smaller than that (for example, 1.6 eV) of the light receiving element for the visible light. The optical value of the energy band gap Eg is calculated from Eg=hv where h is a Plank's constant, and $v=1/\lambda$ ($\lambda$ is a wavelength of a light).

On the other hand, when the thin film semiconductor layer 36 (refer to FIG. 7) is made of amorphous silicon or microcrystalline silicon, it has a light receiving capability (sensitivity) in the ultraviolet light as well as the infrared light because the energy levels of such a semiconductor material are distributed within the band gap. Therefore, the photodiode PD made of such a semiconductor material has the light receiving capability not only in the visible light, but also in the nonvisible lights such as the infrared light and the ultraviolet light. As a result, the photodiode PD can be utilized as the light receiving element for both the visible light and the nonvisible light.

From the foregoing, in the photodiode PD which can be utilized suitably for this embodiment, the thin film semiconductor layer 36 thereof is made of polycrystalline silicon, crystalline silicon, amorphous silicon or microcrystalline silicon. In any case, it is better for the photodiode PD in this embodiment to select the semiconductor material and make the design so that an absorption coefficient for the infrared light becomes larger than that of the normal photodiode designed for reception of the visible light. When it is difficult to make such design, the normal photodiode can also be used in the presence of the optical filter portion 60 (optical filter portion).

<Arithmetically Operating Portion>

As shown in FIG. 2, an arithmetically operating portion 403 is provided in the liquid crystal display device 100. In this case, the arithmetically operating portion 403 receives as inputs thereof a first detection potential Vdet1 sent from the first sensor S1, and a second detection potential Vdet2 sent from the second sensor S2, and obtains a difference between the first detection potential Vdet1 and the second detection potential Vdet2 to generate a detection signal Sdet. The arithmetically operating portion 403 is provided in the data processing portion 400. In this case, the arithmetically operating portion 403, for example, may be realized based on an arithmetic operation function of the control portion 401, or for example, may be realized in the form of a circuit in the position detecting portion 402.

Normally, the following method is adopted for the arithmetic operation carried out in the arithmetically operating portion 403. That is to say, the output signal from the first sensor S1, and the output signal from the second sensor S2 are inputted in serial to the arithmetically operating portion 403, and these input signals are held in inputs of a comparator, respectively. Also, when both the output signals get together in the inputs of the comparator, respectively, the comparator obtains a difference between the two output signals, and the resulting difference is amplified, thereby generating the detection signal Sdet. Alternatively, another method may be adopted such that the levels are detected for the output signals, respectively, by controlling a threshold value of the comparator, and a difference between the two output signals is obtained later. Or, still another method may be adopted such that after the two output signals are converted into digital values, respectively, a difference between the resulting two digital values is arithmetically operated. The levels of the two output signals are determined based on the accumulation of the electric charges, for a given time period, synchronized with the clock signal.

<Materials for Optical Filter Portion and Light Shielding Portion>

A description will now be given with respect to the materials for the optical filter portion and the light shielding portion as the large feature of this embodiment, and a difference in characteristics caused by these materials.

In general, "the optical filter" means a filter for selectively transmitting or reflecting a light having a wavelength in a desired wavelength band.

On the other hand, the optical filter portion 60 (refer to FIG. 2) in this embodiment is made of a material for hardly reflecting the visible light, but absorbing and shielding the visible light, and hardly reflecting a part of the nonvisible light, that is, the nonvisible light having a wavelength in a desired wavelength band, but transmitting such a nonvisible light.

In general, the term "the light shielding" means that no light is transmitted from one surface to the other surface, and thus it is no object to reflect or absorb the light for light shielding. Therefore, the light shielding member such as the black matrix which may be formed in the color filter layer 204 may reflect and shield the light.

On the other hand, the light shielding member 70 (refer to FIG. 2) in this embodiment is made of a material for not reflecting, but absorbing both the visible light and the nonvisible light, thereby shielding both the visible light and the nonvisible light.

In order to selectively transmit (absorb) the light having the wavelength in the specific wavelength band in such a manner, it is effective to use a pigment dispersed resist. In this case, the pigment dispersed resist is obtained by dispersing a pigment for selectively transmitting (absorbing) the light having the wavelength in the specific wavelength band into a resist material having a photosensitivity.

In other words, the optical filter portion 60 in this embodiment is made of the pigment dispersed resist (hereinafter referred to as "a first pigment dispersed resist" when being quoted in any other embodiment). In this case, the first pigment dispersed resist is obtained by dispersing an organic pigment for selectively absorbing the light having the wavelength in the specific wavelength band, and transmitting the light having the wavelength in other wavelength band into the resist. In addition thereto, the light shielding portion 70 in this embodiment is made of a pigment dispersed resist (hereinafter referred to as "a second pigment dispersed resist" when being quoted in any other embodiment). In this case, the second pigment dispersed resist is obtained by disposing an organic or inorganic pigment having an absorbability for the entire wavelength band of the light into a resist.

In this embodiment, it is basic that both the optical filter portion 60 and the light shielding portion 70 have the single layer structures, respectively. However, it is not excluded to provide an entire wavelength transmitting film for antireflection on the back surface side.

An acrylic resist, a polyimide system resist, a novolac system resist or the like can be used as the resist material used in the optical filter portion 60. An azo pigment compound (for example, manufactured by SANYO COLOR WORKS, Ltd. or the like) can be used as the organic pigment for selectively transmitting the IR light having the wavelength in the IR wavelength band.

In addition, the semiconductor process technique is used as the basic technique for forming the optical filter portion 60. That is to say, the pigment dispersed resist is applied onto the substrate, and undergoes the mask exposure process, the development process, and baking process, thereby obtaining a desired pattern shape.

An acrylic resist, a polyimide system resist, a novolac system resist or the like can be used as the resist material used in the light shielding portion 70.

A pigment such as carbon black or titanium black can be used as the organic or inorganic pigment having an absorption property for the entire wavelength.

The semiconductor process technique is used in the method of forming the light shielding portion 70 similarly to the case of the optical filter portion 60. That is to say, the pigment dispersed resist is applied onto the substrate, and undergoes the mask exposure process, the development process, and baking process, thereby obtaining a desired pattern shape.

(Embodiments)

FIG. 8 is a more detailed cross sectional view of FIG. 2 explaining an operation of the liquid crystal panel in the transmission type liquid crystal display device according to a first embodiment. Also, FIG. 8 corresponds to a portion obtained by extracting a part of FIG. 2.

In an embodiment, the first pigment dispersed resist (illustrated as "a pigment black layer 61" in FIG. 8) obtained by dispersing the organic pigment into the resist is used in the optical filter portion 60 for shielding the visible light, and transmitting the infrared light. Copper phthalocyanine compounds (blue and green), and an azo pigment compound (red) are used as the organic pigments for the pigment black layer 61. Also, an acrylic photosensitive resist is used as the resist.

In this embodiment, the pigment dispersed resist obtained by dispersing carbon particles into the acrylic photosensitive resist is used in the light shielding portion 70 for shielding both the visible light and the infrared light. In FIG. 8, the pigment dispersed resist concerned is illustrated as "a carbon black layer 71."

Figure 9:
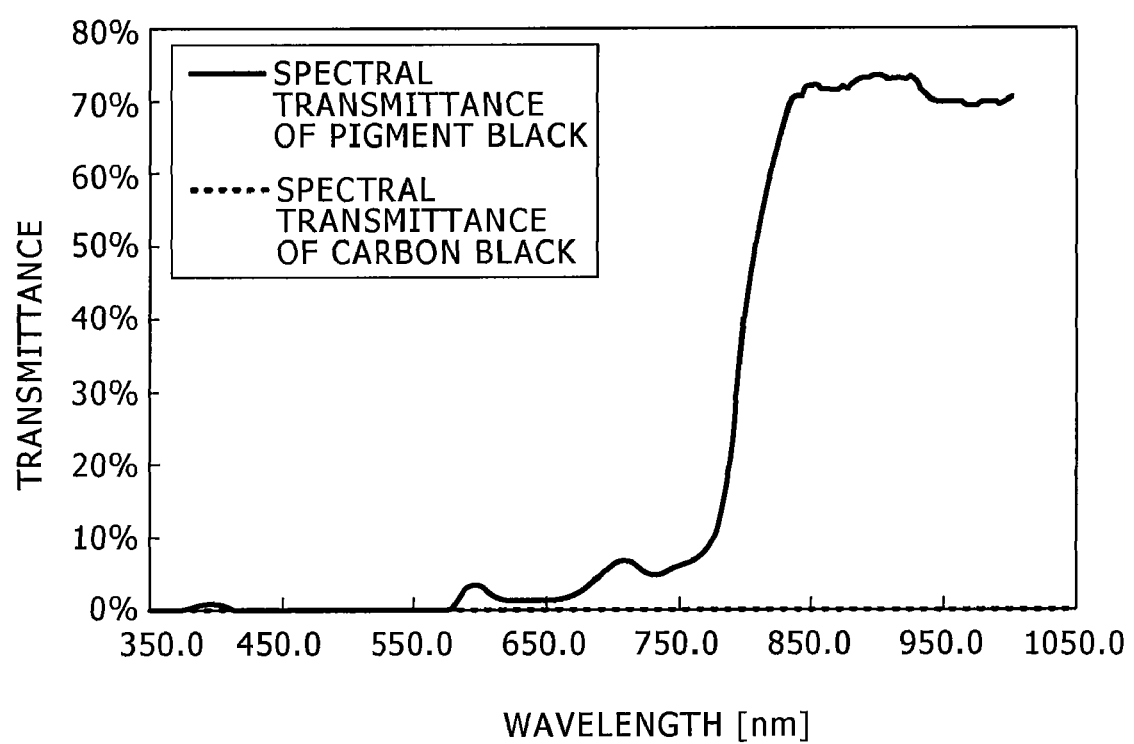
FIG. 9 is a graph showing spectral transmittance characteristics of a pigment black layer and a carbon black layer.

FIG. 9 shows spectral transmittance characteristics of both the pigment black layer 61 and the carbon black layer 71.

It is understood from the graph of FIG. 9 that the pigment black layer 61 selectively transmits the infrared light, and the carbon black layer 71 shields the lights in the entire wavelength band.

(Operation)

Next, an example of an operation of the transmission type liquid crystal display device 100 will be described with reference to FIGS. 1 to 8.

An illumination light emitted from the backlight 300 installed on the back surface side of the liquid crystal panel 200 is made incident to the inside of the liquid crystal panel 200. Also, the illumination light is transmitted through the polarizing plate 206, the TFT array substrate 201, the liquid crystal layer 203, the color filter layer 204, the CF substrate 202, and the polarizing plate 207 in this order to be emitted from the front surface of the liquid crystal panel 200 to the outside.

The illumination light suffers the polarization of light and the modulation during the transmission, so that a polarization surface, a light intensity, and the like of the illumination light change.

In the case of FIG. 8, the illumination light from the backlight 300 is transmitted through the polarizing plate 206 to be made incident to the TFT array substrate 201.

As shown in FIG. 8, the first and second sensors S1 and S2 are formed in the TFT array substrate 201. In this case, the illumination light is made incident to the backlight side of the TFT array substrate 201. As a result, noise components are generated in the first and second detection potentials Vdet1 and Vdet2. However, those noise components are at the same level between the first and second sensors S1 and S2 because they are caused by direct lights from the uniform illumination light, and thus are removed by the arithmetically operating portion 403.

Other lights, for example, pass through an opening portion, within the optical sensor portion 1, indicated by a broken line in FIG. 5A, and an opening portion defined between each two wirings within the pixel PIX shown in FIG. 6, and are outputted from the TFT array substrate 201.

The lights outputted from the TFT array substrate 201 are transmitted through the liquid crystal layer 203, the color filter layer 204, the CF substrate 202, and the polarizing plate 207 (refer to FIG. 1) to be outputted from the display surface 200A to the outside for the display of a picture.

In the cause of this transmission, the transmitted light is polarized in a first direction at the time of being transmitted through the polarizing plate 206. While the light is transmitted through the liquid crystal layer 203, a polarization direction of the transmitted light changes by a predetermined angle along a molecular arrangement direction in the liquid crystal due to optical anisotropy of the liquid crystal molecules. Also, the transmitted light is polarized in a second direction shifted at a predetermined angle from the first direction at the time of being transmitted through the polarizing plate 207.

Of the three polarizing operations, the polarization angles during transmission through the liquid crystal layer 203 change independently of one another so as to correspond to the pixels by controlling a strength of an electric field applied to the liquid crystal layer 203 in correspondence to a potential of the video signal inputted. For this reason, the lights passing through the respective pixels suffer the modulation, with which they change to have brightness corresponding to the potential of the video signal, to be emitted from the display surface 200A of the liquid crystal panel 200 for display of a predetermined image.

As previously stated, the liquid crystal panel 200 has the effective display area PA on which an image is displayed, and a plurality of pixels are disposed in each of the pixel areas PA1 of the effective display area PA. Also, in order to realize the function of the so-called touch panel, the optical sensor portion 1 including the light receiving element for detecting the object to be detected such as the finger of the human being or the stylus pen manipulated by the human being is disposed in the sensor area PA2 of the effective display area PA.

The light passing through the optical sensor portion 1 is directly emitted from the display surface 200A of the liquid crystal panel 200 without suffering the modulation by the electrical signal as in the case of the lights transmitted through the pixels.

Contents displayed may urge the user to make an instruction, for example, in correspondence to the application in the middle of the image display. In such a case, as shown in FIG. 8, the user lightly touches the display screen with his/her finger (or by using the stylus or the like).

When the object to be detected such as the finger or the stylus pen touches or approaches the display screen, the lights emitted from the liquid crystal panel 200 are reflected by the object to be detected to be returned back to the inside of the liquid crystal panel 200. The returned lights (the reflected IR light (IR_R) and the reflected visible light (VL_R)) are repetitively refracted and reflected by the reflecting objects such as the layer interfaces and the wirings within the liquid crystal panel 200. Therefore, in general, the reflected lights spread and advance. As a result, although depending on the size of the object to be detected, the reflected lights reach the first sensor S1 because they can be transmitted through the pigment black layer 61. On the other hand, the reflected lights each reaching the carbon black layer 71 are absorbed to be shielded.

When a part of the reflected lights each reaching the first sensor S1 is made incident to the photodiode PD having a predetermined reverse bias applied thereto, the photodiode PD carries out the photoelectric conversion to output the electric charges generated, for example, from an anode (A) electrode thereof. An amount of electric charges at this time represents the received light data proportional to a quantity of IR light received. The received light data (an amount of electric charges) is outputted in the form of the detected potential Vdet (or the detected current Idet) from the detection line 35 of the reading-out circuit shown in FIG. 5B previously stated.

On the other hand, the second sensor S2 also carries out the same detection operation as that of the first sensor S1. However, any of the reflected lights from the object to be detected is shielded, and thus the light, such as the stray light, turning into a noise component is made incident to the second sensor S2. Since the noise component in the second sensor S2 is at the same level as that of the noise component in the first sensor S1, these noise components are canceled each other by the arithmetically operating portion 403.

As previously stated, the noise components at this time are not reflected by the pigment black layer 61 and the carbon black layer 71. Or, if there is the reflection, since the noise components reflected are each practically, negligibly small, the reflected lights from the pigment black layer 61 and the carbon black layer 71 are not contained in the noise components at this time.

If the reflection is caused and there is a difference in reflectivity between the reflected lights from the pigment black layer 61 and the carbon black layer 71, the detection precision is reduced because the noise component in the first sensor S1 and the noise component in the second sensor S2 are different from each other. However, in the pigment black layer 61 (the optical filter portion 60) and the carbon black layer 71 (the light shielding portion 70) in this embodiment, the reflection at least on the back surface side is prevented from being caused. Therefore, the detection precision is prevented from being reduced by the reflection.

More specifically, the detection potential Vdet (or the detection current Idet) is sent to the sensor driver 13 side by the switch array 14 shown in FIG. 4, and is collected therein as the received light data. The resulting received light data is further inputted to the position detecting portion 402 within the data processing portion 400 shown in FIG. 1. The position detecting portion 402 or the control portion 401 receives successively as an input thereof a set of row address and column address for each detection potential Vdet or detection current Idet in real time from the liquid crystal panel 200 side. For this reason, in the data processing portion 400, intra-panel positional information (the detection potential Vdet or the detection current Idet) on the object to be detected is associated with the row address information and the column address information, and is stored in a memory (not shown).

It is better that the arithmetically operating portion 403 shown in FIG. 2, for example, generates a detection signal Sdet before storage in the memory, and stores the detection signal Sdet in the memory.

The liquid crystal display device 100 can determine whether "the user makes an instruction based on the displayed information with his/her finger or the stylus pen" or "the user inputs predetermined information by moving the stylus pen or the like on the display screen" by combining the positional information on the object to be detected, and the displayed information with each other based on the information stored in the memory. That is to say, in the liquid crystal display device 100, the same function as that in the case where the touch panel is added to the liquid crystal panel 200 can be realized by the thin display panel having no touch panel added thereto. Such a display panel is referred to as "an in-cell touch panel."

According to an embodiment, the direct objects (the infrared light and the visible light) emitted from the backlight are made incident to the light receiving sensor for noise removal. Also, both the visible light and the infrared light on an observation surface side is cut by the carbon black layer. On the other hand, the direct lights (the infrared light and the visible light) emitted from the backlight, and the infrared light (signal) on the observation surface side are made incident to the light receiving sensor for the infrared light. Also, the visible light is cut by the pigment black layer.

With this structure, the signal sent from the light receiving sensor for noise removal is subtracted from the signal sent from the light receiving sensor for the infrared light to cancel the direct lights emitted from the backlight, thereby making it possible to obtain the infrared light (signal).

At this time, the optical filter portion 60 and the light shielding portion 70 do not reflect the lights at least on the back surface side. Therefore, there is obtained an advantage that the object detection operation is further enhanced.

[Second Embodiment]

Figure 10:
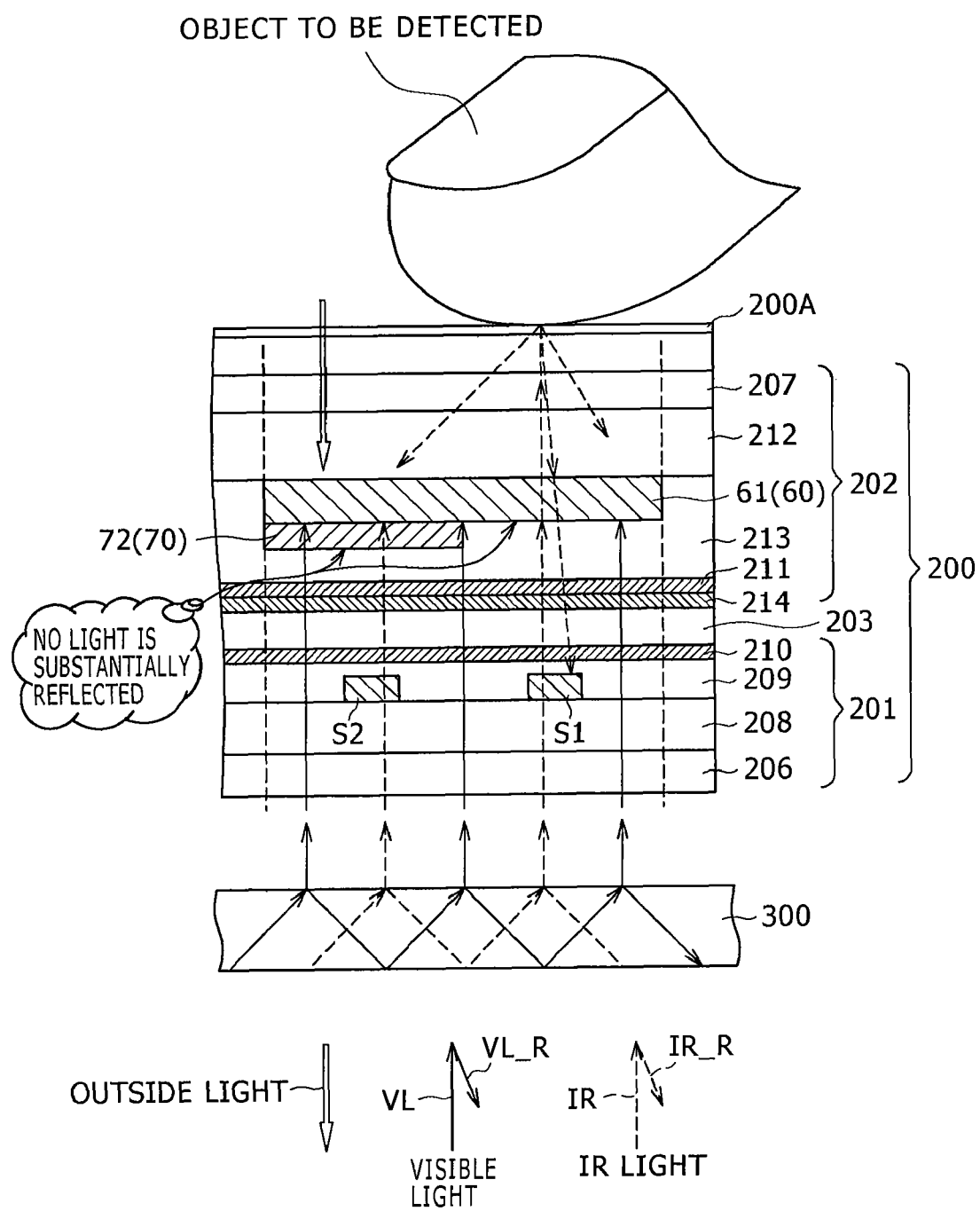
FIG. 10 is a more detailed cross sectional view of FIG. 2 explaining an operation of the liquid crystal panel in the transmission type liquid crystal display device according to the second embodiment.

FIG. 10 is a more detailed cross sectional view of FIG. 2 explaining an operation of the liquid crystal panel in the transmission type liquid crystal display device according to the second embodiment of the present application. Also, FIG. 10 corresponds to a portion obtained by extracting a part of FIG. 2.

The same pigment black layer 61 as that in the first embodiment is used as the optical filter portion 60.

On the other hand, the light shielding portion 70 has the same layer as that of the pigment black layer 61, and an infrared absorbing filter layer 72 is laminated on the back surface side of the light shielding portion 70. The infrared absorbing filter layer 72 is an example of "the layer of the second pigment dispersed resist."

In other words, the feature of the second embodiment is that the light shielding portion 70 of this embodiment "includes the layer of the first pigment dispersed resist (the pigment black layer 61), and the layer of a third pigment dispersed resist (the infrared absorbing filter layer 72) which is disposed on a side opposite to the display surface of the pigment black layer 61, and which is obtained by dispersing an organic pigment for selectively absorbing the light having the wavelength in the second wavelength band (the IR wavelength band), and transmitting the lights having the wavelengths in other first wavelength band into the resist."

The pigment dispersed resist obtained by dispersing the organic pigment for absorbing the infrared light into the resist is used as the infrared absorbing filter layer 72.

A titanium/aluminum/iron phthalocyanine compound is used as the organic pigment for absorbing the infrared light, and an acrylic photosensitive resist is used as the resist.

Figure 11:
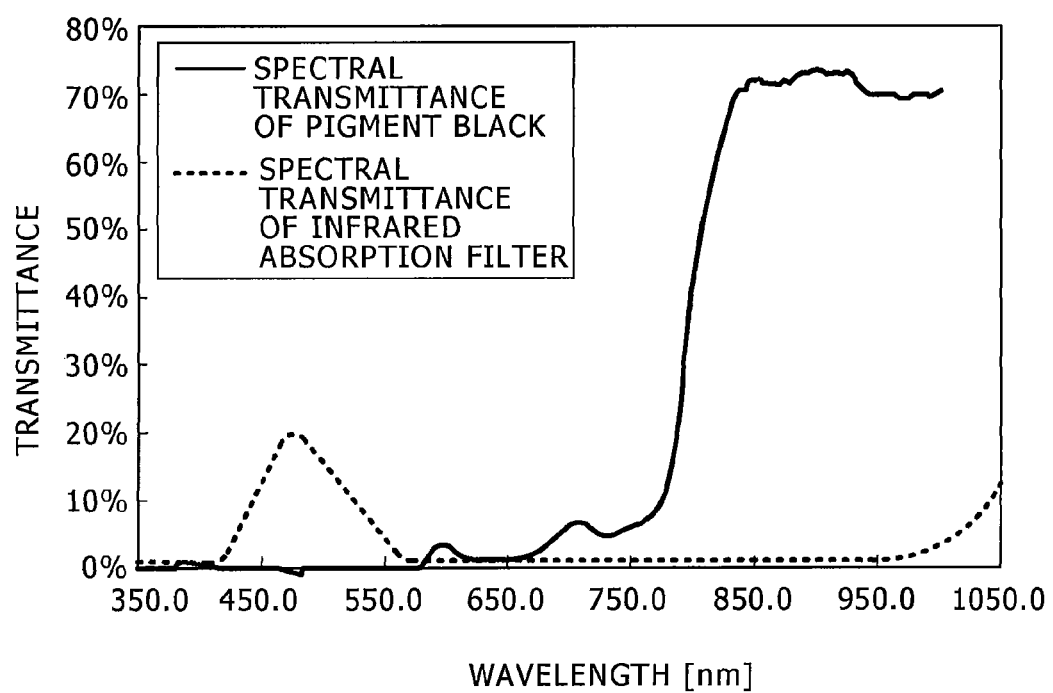
FIG. 11 is a graph showing spectral transmittance characteristics of a laminate film of the pigment black layer and an infrared absorbing filter layer.

FIG. 11 shows spectral transmittance characteristics of a laminate film of the pigment black layer 61 and the infrared absorbing filter layer 72.

It is understood from the graph of FIG. 11 that the pigment black layer 61 selectively transmits the infrared light, and the infrared absorbing filter layer 72 shields the infrared light.

Other constituent elements, that is, the constituent elements of FIG. 10 designated with the same reference numerals and reference symbols of the constituent elements of FIG. 2, other constituent elements shown in FIGS. 1 to 7, and the basic operation are common with those in the first embodiment.

Similarly to the case of the first embodiment, the direct lights (the infrared light and the visible light) emitted from the backlight 300 are made incident to the second sensor S2. Also, the visible light (including the outside light) on the observation surface side (on the display surface side) is cut by the pigment black layer 61, and the infrared light is cut by the infrared absorbing filter layer 72.

On the other hand, the direct lights (the infrared light and the visible light) emitted from the backlight 300 and the infrared light (signal) on the observation surface side are made incident to the first sensor S1. Also, the visible noise is cut by the pigment black layer 61.

At this time, no reflection is caused on the back surface side of the pigment black layer 61, and the back surface side of the infrared absorbing filter layer 72. Or, if the reflection is caused on such sides, since the reflection concerned is practically, negligibly small, the precision for the detection signal Sdet obtained from the arithmetically operating portion 403 shown in FIG. 2 is enhanced.

[Third Embodiment]

Figure 12:
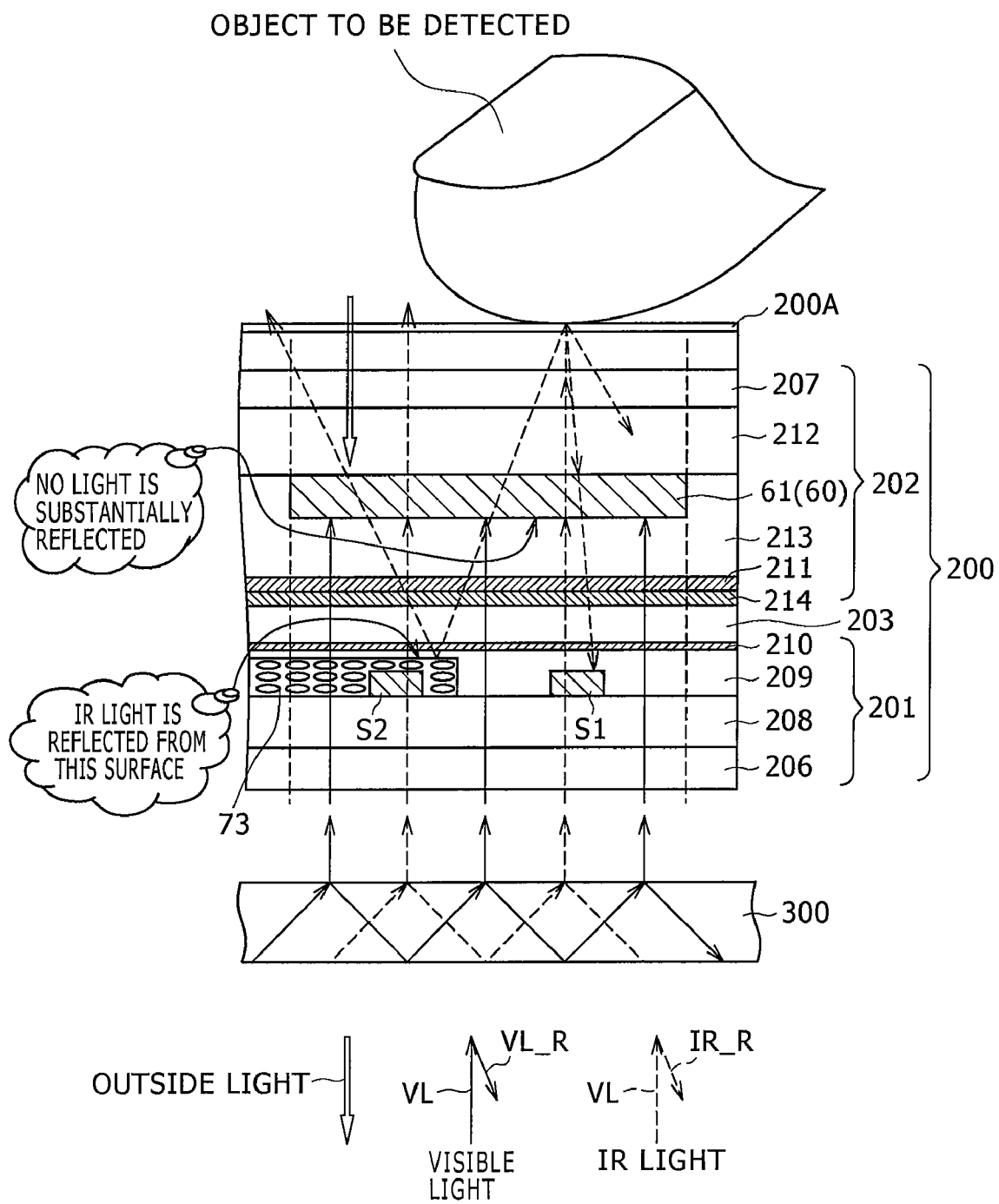
FIG. 12 is a more detailed cross sectional view of FIG. 2 explaining an operation of the liquid crystal panel in the transmission type liquid crystal display device according to the third embodiment.

FIG. 12 is a more detailed cross sectional view of FIG. 2 explaining an operation of the liquid crystal panel in the transmission type liquid crystal display device according to the third embodiment of the present application. Also, FIG. 12 corresponds to a portion obtained by extracting a part of FIG. 2.

The same pigment black layer 61 as that in each of the first and second embodiment is used in the optical filter portion 60. In addition, a cholesteric selectively reflecting film 73 as a part of "the wavelength-selective mirror portion" is selectively disposed on the second sensor S2.

Figure 13A:
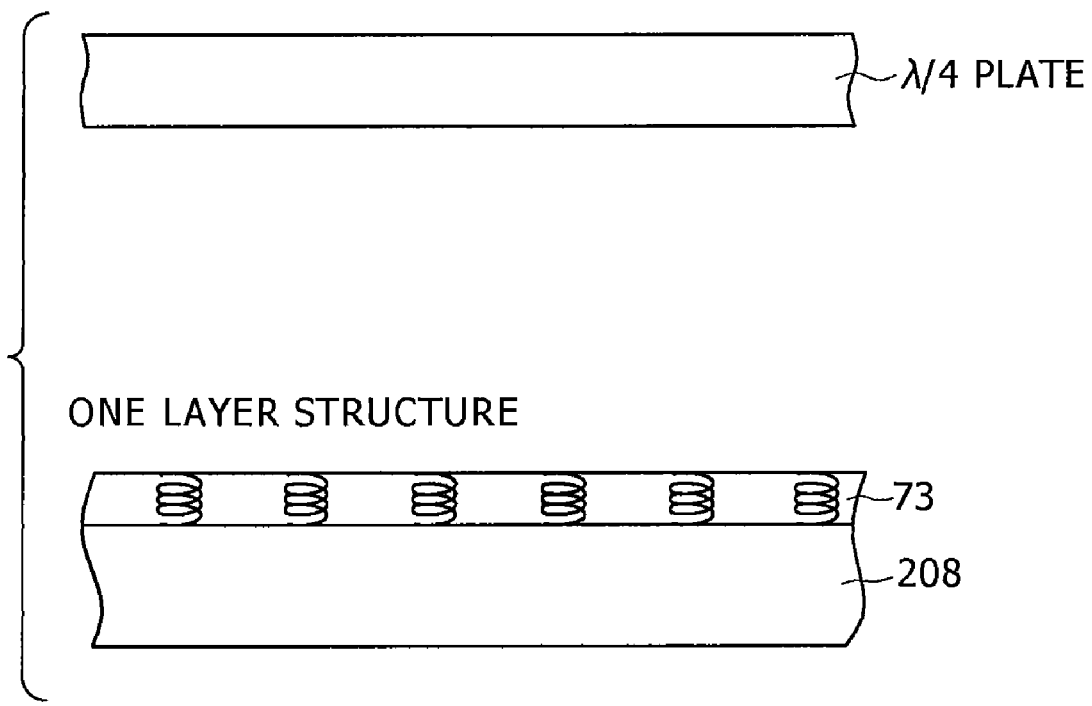
FIGS. 13A and 13B are respectively views showing schematic structures of a cholesteric selectively reflecting film in the transmission type liquid crystal display device according to the third embodiment.
Figure 13B:
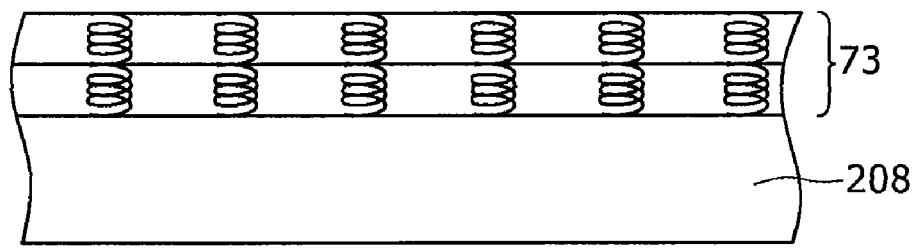
Figure 14:
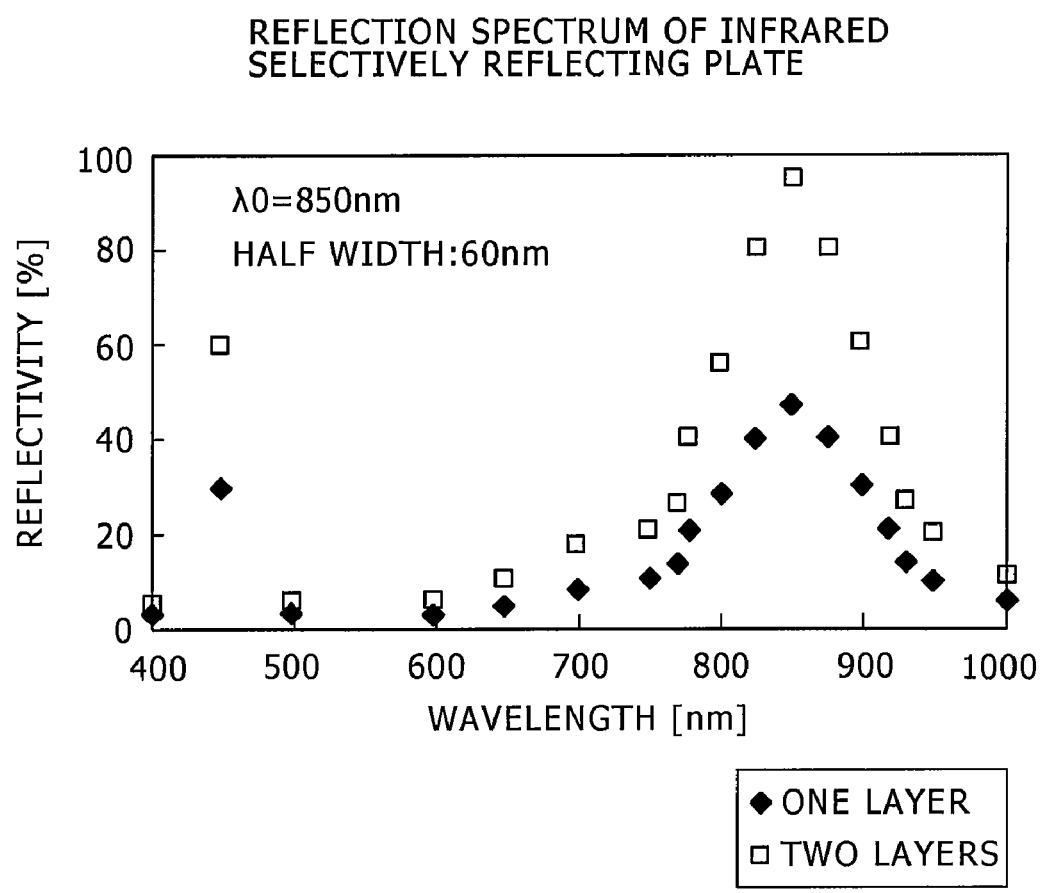
FIG. 14 is a graph showing spectral transmittance characteristics of the cholesteric selectively reflecting film in the transmission type liquid crystal display device according to the third embodiment.

FIGS. 13A and 13B show a structure of the cholesteric selectively reflecting film 73. In addition, FIG. 14 shows spectral reflectivity characteristics of the cholesteric selectively reflecting film 73.

A selective reflection wavelength, λ, of the cholesteric selectively reflecting film 73 is set as 850 nm. Also, it is possible to use one of one layer structure (refer to FIG. 13A) having a clockwise cholesteric rotation direction or a counterclock cholesteric rotation direction, and two layer luminance structure (refer to FIG. 13B) having a clockwise cholesteric rotation direction and a counterclock cholesteric rotation direction. In the case of FIG. 13A, a λ/4 plate such as a VA (vertically aligned) or an ECB (electrically-controlled birefringence), for example, may be disposed either outside the liquid crystal panel 200 or between the oriented film 214 and the polarizing plate 207 shown in FIG. 2.

When there is used the polarizing plate 207 or the like having a sufficient polarization degree for the infrared light in a mode having the λ/4 plate disposed therein, even the one layer structure is enough because the panel incident light becomes a circularly polarized light. When the conditions described above are not fulfilled, it is effective to use the two layer structure.

The cholesteric selectively reflecting film 73 can be patterned as follows. That is to say, a resist is applied onto the cholesteric selectively reflecting film 73, and suffers the mask exposure process, the development process, and the resist peeling process, thereby obtaining a desired pattern. In addition, a process may also be adopted such that the cholesteric liquid crystal is given a photosensitivity, and is patterned in the mask exposure process.

Other constituent elements, that is, the constituent elements of FIG. 10 designated with the same reference numerals and reference symbols of the constituent elements of FIG. 2, other constituent elements shown in FIGS. 1 to 7, and the basic operation are common with those in the first embodiment.

In FIG. 12, the direct lights (the infrared light and the visible light) emitted from the backlight 300 are made incident to the second sensor S2. Also, the visible light on the observation surface side is cut (reflected) by the pigment black layer 61, and the infrared light is cut (reflected) by the cholesteric selectively reflecting film 73.

On the other hand, the direct lights (the infrared light and the visible light) emitted from the backlight 300 and the infrared light (signal) on the observation surface side are made incident to the first sensor S1. Also, the visible noise is cut by the pigment black layer 61.

With this structure, the signal sent from the light receiving sensor for noise removal is subtracted from the signal sent from the light receiving sensor for the infrared light to cancel the direct lights emitted from the backlight, thereby making it possible to obtain the infrared light signal.

The display device according to the present invention is by no means limited to the embodiments described above, and the following various modification can be made.

<Modification 1>

In the first embodiment, a metallic thin film can also be used in the method of obtaining the light shielding portion 70. Chromium, titanium or the like is used as a material for the metallic thin film. It is effective for antireflection that a dielectric multilayer film is formed from an oxide film and the like, thereby performing the antireflection in a desired wavelength band. For the resulting antireflection film, the multilayer film structure, and the materials are determined so that the antireflection film has a light absorption property especially on the back surface side.

A method of patterning the metallic thin film is described as follows. That is to say, a resist is applied onto the metallic thin film, and suffers the mask exposure process, the development process, and the resist peeling process, thereby obtaining a desired pattern.

<Modification 2>

Any of the first to third embodiments can also be applied to a reflection type liquid crystal display device.

In the general reflection type liquid crystal panel, no backlight 300 is provided in the liquid crystal display device 100 shown in FIG. 1, and an illumination portion (frontlight) is disposed between the liquid crystal layer 203 and the display surface 200A instead of providing the backlight 300.

In this case as well, the lights which are transmitted from the front side to the sensor disposition area to turn into the stray light are absorbed by the optical filter portion 60 and the light shielding portion 70, and no light is reflected from the optical filter portion 60 and the light shielding portion 70. As a result, a quantity of light turning into the noise component in the first sensor S1, and a quantity of light turning into the noise component in the second sensor S2 become equal to each other, and thus the detection sensitivity is further enhanced.

<Modification 3>

In the third embodiment, a method of using an interference of the dielectric multilayer film as the cholesteric selectively reflecting film 73, or a method of controlling the selective reflection wavelength based on a chiral pitch of the cholesteric liquid crystal may also be applied to as means for selectively reflecting the light having the wavelength in the specific wavelength band.

<Modification 4>

A modification 4 shows an example in which in addition to the photodiode PD as the light receiving element for receiving the nonvisible light, the outside light containing therein the visible light as a main component is detected, and the intensity of the light outputted from the backlight 300 shown in FIG. 1 in correspondence to the detection result. Although in this case, a modification of the first embodiment is now described, the modification 4 can also be applied to any other embodiment as long as it has the illumination portion such as the backlight.

An outside light sensor for detecting the outside light, although not especially illustrated, is disposed either in the effective display area PA or in the circumjacent area CA in the liquid crystal panel 200 shown in FIG. 1. A position where the outside light sensor is disposed, and the number of outside light sensors disposed are arbitrarily set.

When the outside light sensors are disposed within the effective display area PA, the outside light sensors can be disposed in a matrix similarly to the case of the optical sensor (the photodiode PD) for receiving the nonvisible light. In this case, the outside light sensors are disposed in positions at equal distance from a plurality of optical sensors existing in the circumferences thereof, respectively. For example, it is preferable that, for example, the photodiodes PD and the outside sensors are disposed to form a checkered pattern in a planar view of the effective display area PA.

Although not forming the checkered pattern, the outside light sensors may be disposed at equal intervals. In addition thereto, the outside light sensors may be disposed in the vicinities of the four corners of the effective display area PA, may be disposed in arrangement in positions near at least one side of outer sides of the effective display area PA, and so forth. Thus, there is not a limit on the disposition of the outside light sensors and the number of outside light sensors.

With regard to the basic structure of the outside light sensor, the equivalent circuit and the plane pattern similarly to those shown in FIGS. 5A and 5B can be applied. However, the material or the like for the thin film semiconductor layer of the photodiode as the outside light sensor may be different from that of the photodiode PD as the optical sensor. For example, it is better that the thin film semiconductor layer for the outside light sensor is made of amorphous silicon or microcrystalline silicon having the energy band gap broadly distributed so as to have a sensitivity to the visible light having the wavelength regulated in the range of 350 nm to 700 nm. For example, a material having an energy band gap of 1.6 eV can be used for the thin film semiconductor layer of the outside light sensor.

Note that, it is previously stated that the material, such as amorphous silicon or microcrystalline silicon, for the thin film semiconductor layer can be used for the photodiode PD as well as the nonvisible light sensor. However, the layers which are formed so that their infrared absorption characteristics are different from each other are used as the thin film semiconductor layer in this case, and the thin film semiconductor layer for the outside light sensor, respectively, because they are different in energy band gap from each other. However, although the sensitivity is slightly low because of the different energy band gap, polysilicon or crystalline silicon can be used as the materials for the thin film semiconductor layers of the visible light sensor and the optical sensor. In such a case, it is preferable to give the filter side the wavelength selectivity.

The data processing portion 400 shown in FIG. 1 controls the operation for emitting the illumination light by the backlight 300 based on the received light data obtained from the outside light sensor. The position detecting portion 402 which operates under the control by the control portion 401 detects an amplitude of a signal (an amount of electric charges accumulated) proportional to a luminance of the outside light based on the received light data, that is, the voltage value (the detection potential Vdet) or the current value (the detection current Idet). The control portion 401 adjusts an emission intensity of the light emitted from the backlight 300 of the liquid crystal display device 100 based on the detection result.

As a result, when the intensity of the received light is large in the received light data obtained from the outside light sensor, the backlight 300 is controlled so as to radiate an illumination light having the larger intensity to the liquid crystal panel 200, and when the intensity of the received light is small in the received light data obtained from the outside light sensor, the backlight 300 is controlled so as to radiate an illumination light having the smaller intensity to the liquid crystal panel 200.

In the display device having the pixel switches composed of the thin film transistors, in general, in the environment in which the outside light (especially, the solar light) breaks through from the outside, the contrast is reduced in the display device owing to the reflection of the outside light from the surface layer of the display panel. As a result, the image can not be satisfactorily recognized in some cases. For this reason, the illumination of the light emitted from the display panel itself to the outside of the surface thereof needs to be made larger than or equal to the luminance of the reflected light from the surface of the display panel. In order to attain this, the intensity of emission of the light from the backlight 300 radiating the light from the back surface to the display panel is more strongly controlled.

In addition, in a state in which the intensity of the outside light is very low as in darkness or the like, the reduction in image quality (the reduction in contrast) due to the reflected light from the surface of the display panel is not caused. Thus, it is necessary to reduce the intensity of emission of the light from the backlight 300. In the modification 4, it is possible to reduce the surface luminance of the display device, which results in that it is possible to cut down the power consumption of the backlight 300.

The modification 4 has an advantage that such reduction in image quality (the reduction in contrast), and such cut-down of the power consumption can be adaptively controlled in correspondence to a change in quantity of outside light.

Figure 15:
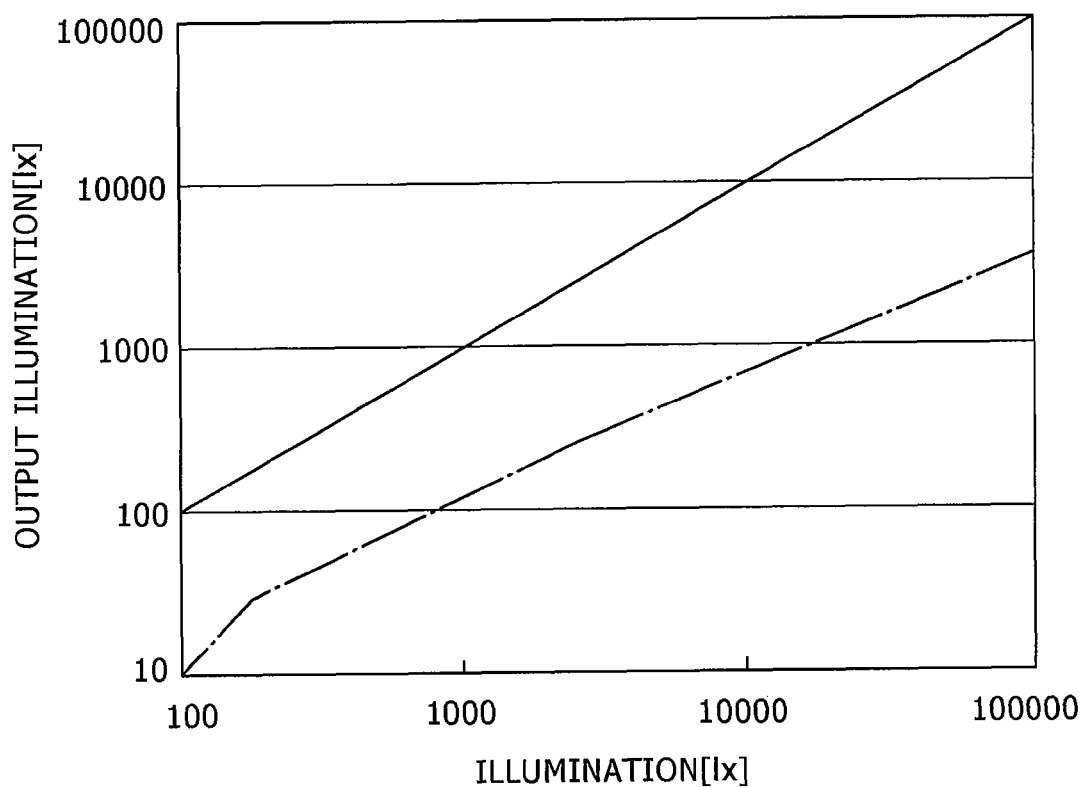
FIG. 15 is a graph showing a modification with respect to an intensity of an input light of light received data according to a modification 4 of the first embodiment of the present application.

FIG. 15 is a graph showing a change in received light data, with respect to an intensity of an input light, which is obtained in the case where the outside light sensor is formed in the effective display area PA (application of the intra-display area disposition), and a change in received light data, with respect to an intensity of an input light, which is obtained in the case where the outside light sensor is formed in the circumjacent area CA (nonapplication of the intra-display area disposition). In FIG. 15, an axis of abscissa represents illumination (unit: lux [lx]) of the outside light, and an axis of ordinate represents output illumination (unit: lux [lx]) to which a value of the received light data obtained from the outside light sensor is converted. In FIG. 15, a solid line indicates a curve in the case where the intra-display area disposition of the outside light sensor is applied, and a broken line indicates a curve in the case of nonapplication of the intra-display area disposition.

As shown in FIG. 15, for example, when the outside light having the illumination of 1,000 lx is made incident to the liquid crystal panel 200, the received light data corresponding to the illumination of about 100 lx is obtained in the case where the outside light sensor is formed in the circumjacent area CA. On the other hand, the received light data corresponding to the illumination of about 1,000 lx is obtained in the case where the outside light sensor is formed in the effective display area PA. Providing the outside light sensor in the effective display area PA in such a manner, thereby making it possible to receive the light having the high intensity.

Therefore, it is understood from the graph of FIG. 15 that it is preferable to dispose the outside light sensor within the effective display area PA.

Figure 16A:
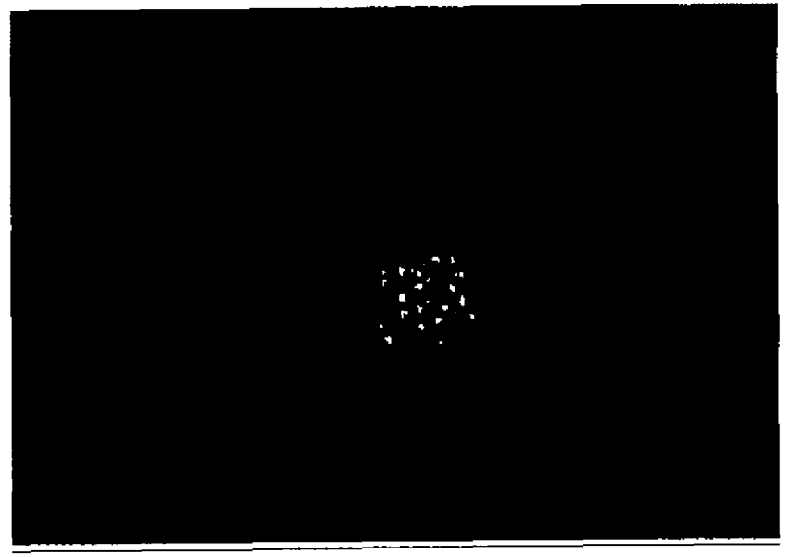
FIGS. 16A and 16B are respectively views showing a detection result when a fingertip is detected in the case where no intra-display area disposition of an outside light sensor is applied, and a detection result when the fingertip is detected in the case where an intra-display area disposition of an outside light sensor is applied.
Figure 16B:
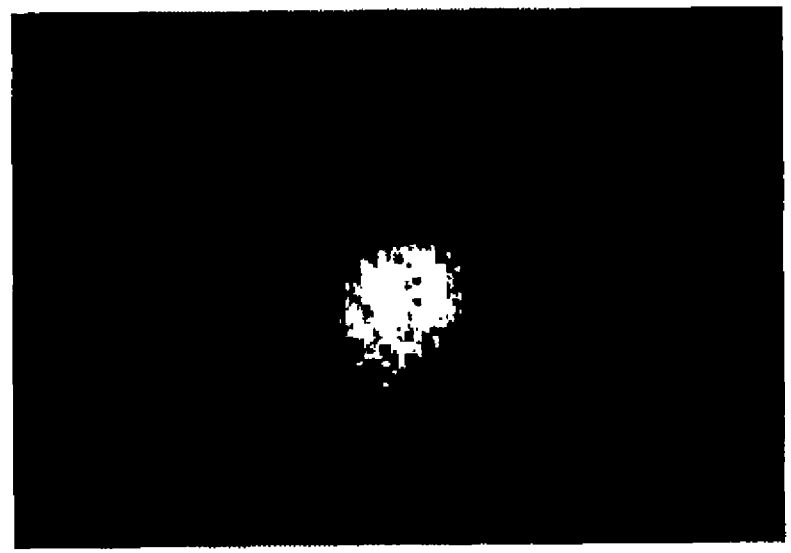

FIG. 16A shows a picture when the fingertip is detected without application of the modification 4, and FIG. 16B shows a picture when the fingertip is detected with the modification 4 being applied.

Each of the pictures shown in FIGS. 16A and 16B, respectively, is obtained in a way that the output signals from a plurality of optical sensor portions disposed finely in a matrix are represented in the form of dot display on detection (white) and non-detection (black), and the resulting dots are mapped on the picture.

It is understood from the views of FIGS. 16A and 16B as well that the detection precision is higher in the case where the outside light sensor is disposed within the effective display area PA than in the case where the outside light sensor is disposed in the circumjacent area CA.

According to the modification 4, there is offered the advantage that the reduction in image quality (the reduction in contrast), and the cut-down of the power consumption can be adaptively controlled in correspondence to a change in quantity of outside light. In addition thereto, there is also offered the advantage that generation of the stray light of the visible light can be prevented or suppressed all the more because when especially, a quantity of outside light is less in the circumference, a quantity of light from the backlight 300 more than needed is not made incident to the liquid crystal panel 200. This offers an advantage that when the photodiode PD as the optical sensor shown in FIGS. 7A and 7B, and the like has the sensitivity to the visible light in addition to the nonvisible light (such as the IR light), it is possible to enhance the precision for the position detection.

Note that, in the modification 4, when it is determined that the intensity of the outside light detected by the outside light sensor is large to some extent, the shadow of the object to be detected caused by the outside light may be detected from both the output signal from the optical sensor portion 1 and the output signal from the output light sensor. Also, presence or absence, a position or a size of the object to be detected may also be detected based on the detection result.

<Modification 5: Other Modifiable Points>

Although the infrared light (IR light) is mainly used as the nonvisible light in the description in the first to third embodiments and the modification 4 thereof, the ultraviolet light may also be used as the nonvisible light.

The backlight 300 is by no means limited to one having the light source and the light guide member. For example, there may be adopted the backlight having only the light source as in the case of the backlight having a plurality of LEDs two-dimensionally disposed. In addition, the backlight 300 is by no means limited a surface light source, and thus may be a line light source or a point light source. The light guide member is by no means limited to one having a plate-like shape (the light guide plate 302). For example, the light guide member may be one having a lengthy rectangular parallelepiped-like shape or a cubic shape.

All the TFT structures and the Thin Film Diode (TFD) structure having the control gate CG in the photodiode PD, the reset transistor TS, the amplifier transistor TA, and the reading-out transistor TR in the reading-out transistor (refer to FIG. 5B), and the switching element SW in the pixel circuit may also be each formed as being of a top gate type. In this case, it is preferable that at least the back surface sides of the light receiving region (the I region or the D region) of the TFD, and the channel formation region of the TFT are covered with the light shielding layer, thereby preventing the direct lights from the backlight 300 from being made incident to these light receiving region and channel formation region.

<Modification 6>

The first to third embodiments and modifications thereof can be generally applied to a self light emission type display device such as the organic EL display device, a display device using electron floating applicable to an electron paper or the like as well as the liquid crystal display device.

The display device using the electron floating is provided with an electron ink between pixel electrodes and a common electrode included in a counter electrode (transparent substrate). The electron ink is used instead of using the liquid crystal layer 203 shown in FIG. 1, and includes a plurality of microcapsules having white particles charged positively and black particles charged negatively which get muddy in a liquid. In the electron floating, when a polarity of an electric field applied across the pixel electrode and the common electrode is positive and negative, the particles moving to the pixel electrode side and the particles moving to the common electrode side are inversed between white and black. Thus, it is utilized that when a rate of the many white particles move to the transparent electrode side, the pixel is seen to be bright for an observer. As a result, the gradation display of the pixel corresponding to the input data is made possible. For this reason, the description of the first to third embodiments described above can be approximately, similarly applied to the modification 6 except for how to optically modulate the liquid crystal layer.

On the other hand, the organic EL display device utilizes a phenomenon that the backlight is unnecessary, and an organic material film itself laminated every pixel within the display panel emits a light with a luminance corresponding to a magnitude of an electric field applied thereto. The description of the first to third embodiments described above can be almost, similarly applied to the modification 6 except for this respect.

<Examples of Products to Each of Which Display Device is Applied>

The first to third embodiments and the modifications 1 to 6 thereof can be applied to a display device for characters and images of the following products.

Specifically, the first to third embodiments described above and the modifications 1 to 6 thereof can be applied to a television receiver, a monitoring device of a personal computer or the like, a mobile apparatus, having an image reproducing function, such as a mobile phone, a game machine, or a PDA, a photographing apparatus such as a still camera or a video camera, an on-board apparatus such as a car navigation system, and the like.

According to the first to third embodiments described above and the modifications 1 to 6 thereof, there are obtained the following advantages.

It is unnecessary to provide the resistive or electrically capacitive touch panel, having a two layer conductive film or a thin glass, which is disposed on the front surface side of the display panel. That is to say, it is possible to realize "an in-cell touch panel" including the function of the touch panel within the display panel. For this reason, it is possible to compactify, especially, thinner the display device.

A plurality of distant portions can be simultaneously detected because the received light data on the detected position, and an address thereof are stored in combination with each other. In addition, it is possible to detect not only a position of an object to be detected, but also a size thereof.

At this time, the problems about the noise caused by the direct incident lights directly made incident from the backlight to the sensor and the stray light depending on the display pattern can be solved by the device structure. In this case, with the device structure, the noises of the direct incident lights (the visible light and the infrared light) emitted from the backlight, the outside light (visible light), and the scattered lights (visible lights) of the display light from the surface are separated from one another, thereby making it possible to take out only the infrared light made incident from the observation surface. As a result, it is possible to provide the input function integrated image display device which can reliably detect a position of an object to be detected irrespective of the environment and the display pattern.

In the modification 4, the detection of the outside light based on the visible light can be implemented in the display area of the display device. In particular, when the outside light sensors are disposed within the effective display area, the surface luminance on the display device can be more precisely measured as compared with the case of the system in which the outside light sensors are disposed outside the display area. As a result, the control precision for the emission intensity in the backlight is further enhanced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device, comprising:
a display surface on which information is displayed;
a plurality of pixel areas including optical elements, respectively, each of said optical elements being adapted to generate a light having an intensity corresponding to data inputted and to output the light to said display surface;
a plurality of sensor areas each of which includes a pair of light receiving elements, each of said light receiving elements being adapted to receive an incident light and to subject the incident light to photoelectric conversion;
an optical filter portion disposed between a first light receiving element and said display surface within the corresponding one of said plurality of sensors, said optical filter portion being adapted to absorb and shield the incident light in a visible light band, and to transmit the incident light in a nonvisible light band;
a light shielding portion, having a light absorbing property, disposed between a second light receiving element disposed close to said first light receiving element, and said display surface within the corresponding one of said plurality of sensor areas, said light shielding portion being adapted to absorb and shield the incident light; and
an arithmetically operating portion for obtaining a difference between an output signal from said first light receiving element, and an output signal from said second light receiving element wherein said optical filter portion is made of a first pigment dispersed resist obtained by dispersing an organic pigment for selectively absorbing a light in a specific wavelength band, and transmitting lights in other wavelength band into a resist; and
said light shielding portion is made of a second pigment dispersed resist obtained by dispersing an organic or inorganic pigment having an absorbing property for an entire wavelength band of lights into a resist.

2. A display device, comprising:
a display surface on which information is displayed;
a plurality of pixel areas including optical elements, respectively, each of said optical elements being adapted to generate a light having an intensity corresponding to data inputted and to output the light to said display surface;
a plurality of sensor areas each of which includes a pair of light receiving elements, each of said light receiving elements being adapted to receive an incident light and to subject the incident light to photoelectric conversion;
an optical filter portion disposed between a first light receiving element and said display surface within the corresponding one of said plurality of sensors, said optical filter portion being adapted to absorb and shield the incident light in a visible light band, and to transmit the incident light in a nonvisible light band;
a light shielding portion, having a light absorbing property, dsposed between a second light receiving element disposed close to said first light receiving element, and said display surface within the corresponding one of said plurality of sensor areas, said light shielding portion being adapted to absorb and shield the incident light; and
an arithmetically operating portion for obtaining a difference between an output signal from said first light receiving element, and an output signal from said second light receiving element wherein said optical filter portion is made of a first pigment dispersed resist obtained by dispersing an organic pigment for selectively absorbing a light in a specific first wavelength band, and transmitting lights in other second wavelength band into a resist; and
said light shielding portion including:
a layer made of the first pigment dispersed resist; and
a layer made of a third pigment dispersed resist obtained by dispersing an organic pigment for selectively absorbing the light in the second wavelength band, and transmitting the light in the first wavelength band, said layer being disposed on a side, of said layer made of the first pigment dispersed resist, opposite to said display surface.

3. A display device, comprising;
a display surface on which information is displayed;
a plurality of pixel areas including optical elements, respectively, each of said optical elements being adapted to generate a light having an intensity corresponding to data inputted and to output the light to said display surface;
a plurality of sensor areas each of which includes a pair of light receiving elements, each of said light receiving elements being adapted to receive an incident light and to subject the incident light to photoelectric conversion;
an optical filter portion disposed between a first light receiving element and said display surface within the corresponding one of said plurality of sensors, said optical filter portion being adapted to absorb and shield the incident light in a visible light band, and to transmit the incident light in a nonvisible light band;

a light shielding portion, having a light absorbing property, disposed between a second light receiving element disposed close to said first light receiving element, and said display surface within the corresponding one of said plurality of sensor areas, said light shielding portion being adapted to absorb and shield the incident light; and an arithmetically operating portion for obtaining a difference between an output signal from said first light receiving element, and an output signal from said second light receiving element wherein said optical filter portion is made of a first pigment dispersed resist obtained by dispersing an organic pigment for selectively absorbing a light in a specific first wavelength band, and transmitting lights in other second wavelength band into a resist; and said light shielding portion including:

a metallic film; and an antireflection film formed at least on a surface of said metallic film opposite to said display surface.

4. The display device according to claim 3, wherein said antireflection film is one having a light absorbing property for attenuating an incident light.

5. A display device, comprising:

a display surface on which information is displayed;

a plurality of pixel areas including optical elements, respectively, each of said optical elements being adapted to generate a light having an intensity corresponding to data inputted and to output the light to said display surface;

a plurality of sensor areas each of which includes a pair of light receiving elements, each of said light receiving elements being adapted to receive an incident light and to subject the incident light to photoelectric conversion;

an optical filter portion disposed between a first light receiving element and said display surface within the corresponding one of said plurality of sensors, said optical filter portion being adapted to absorb and shield the incident light in a visible light band, and to transmit the incident light in a nonvisible light band;

a wavelength-selective mirror portion disposed between a second light receiving element disposed close to said first light receiving element, and said display surface within the corresponding one of said plurality of sensor areas, said wavelength-selective mirror portion being adapted to reflect a nonvisible light, in a specific wavelength band, made incident thereto from the display surface side, to transmit a light in a wavelength band other than the specific wavelength band, and to transmit a light made incident thereto from a side opposite to the display surface side; and an arithmetically operating portion for obtaining a difference between an output signal from said first light receiving element, and an output signal from said second light receiving element; and wherein said wavelength-selective mirror portion includes a layer containing therein a cholesteric liquid crystal composition for selectively reflecting a nonvisible light, in a specific wavelength band, made incident thereto from the display surface side, and transmitting a non-vibible light in a wavelength band other than the specific wavelength band, and a visible light made incident thereto from the display surface side, and a light made incident thereto from a side opposite to the display surface side.

* * * * *